Figure 1:
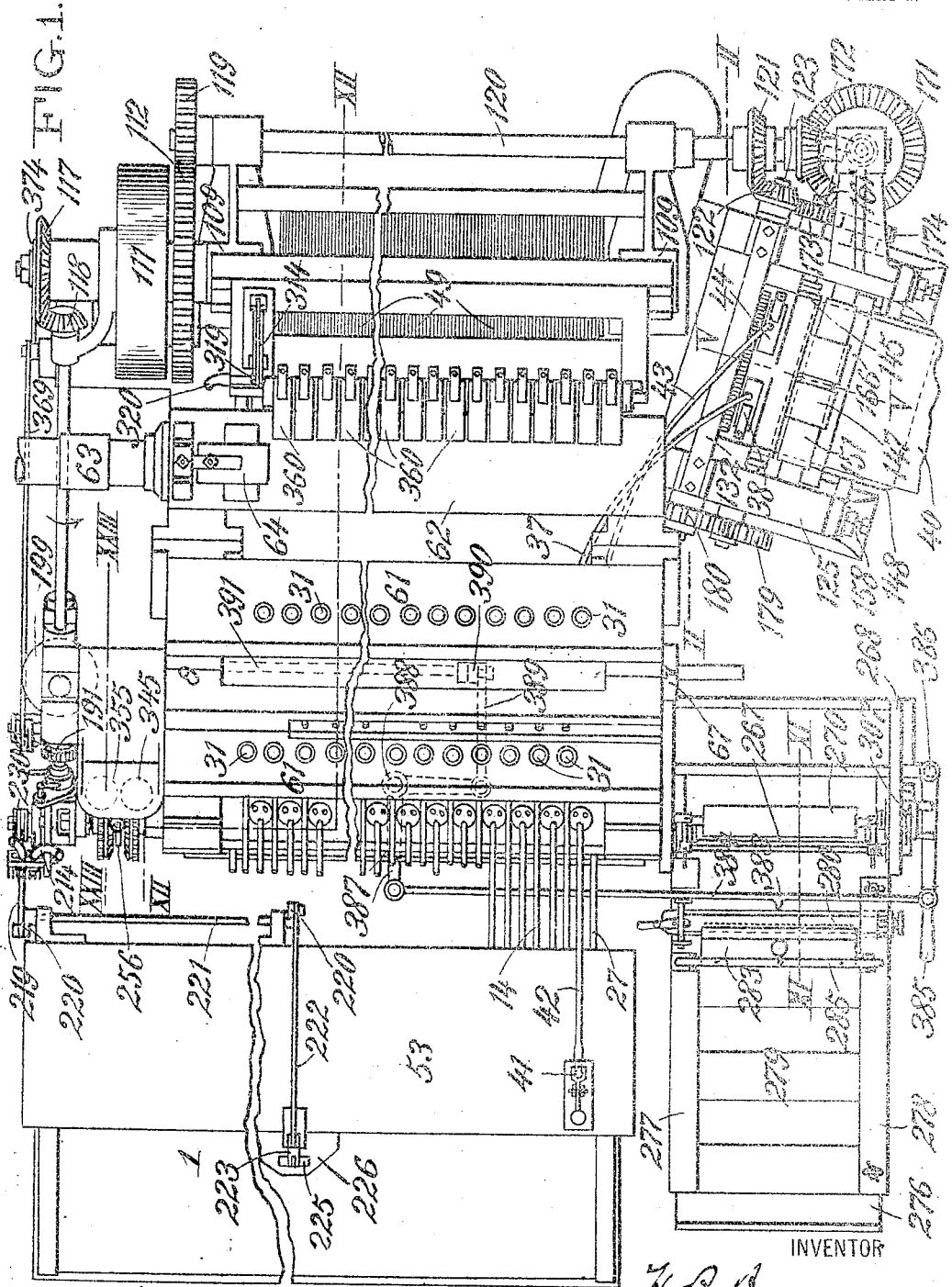

H. P. BALL.
APPARATUS FOR PRODUCING PERFORATED RECORDS FOR AUTOMATIC PIANO PLAYERS.
APPLICATION FILED OCT. 9, 1907.

938,452.

Patented Oct. 26, 1909.
16 SHEETS—SHEET 1.

H. P. BALL.
APPARATUS FOR PRODUCING PERFORATED RECORDS FOR AUTOMATIC PIANO PLAYERS.
APPLICATION FILED OCT. 9, 1907.

938,452.

Patented Oct. 26, 1909.

16 SHEETS—SHEET 2.

FIG. 2.

WITNESSES:
Frederick A. Blount
Paul H. Marron

INVENTOR
H. P. Ball
BY
Geo. H. Benjamin
ATTORNEY

H. P. BALL.
APPARATUS FOR PRODUCING PERFORATED RECORDS FOR AUTOMATIC PIANO PLAYERS.
APPLICATION FILED OCT. 9, 1907.
938,452.
Patented Oct. 26, 1909.
16 SHEETS—SHEET 4.
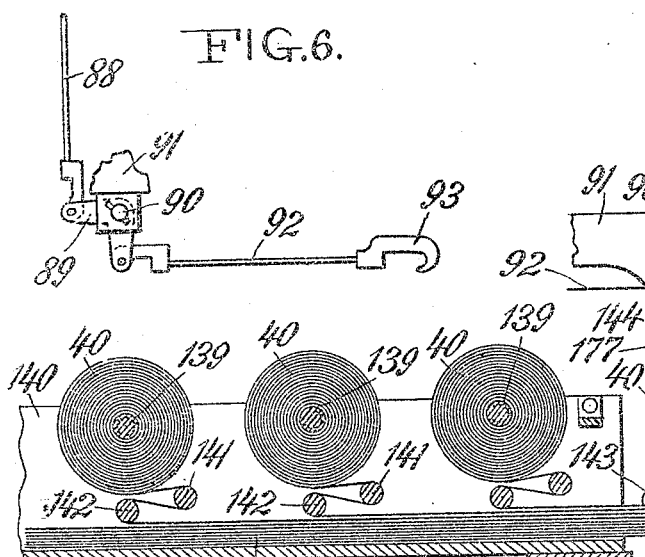
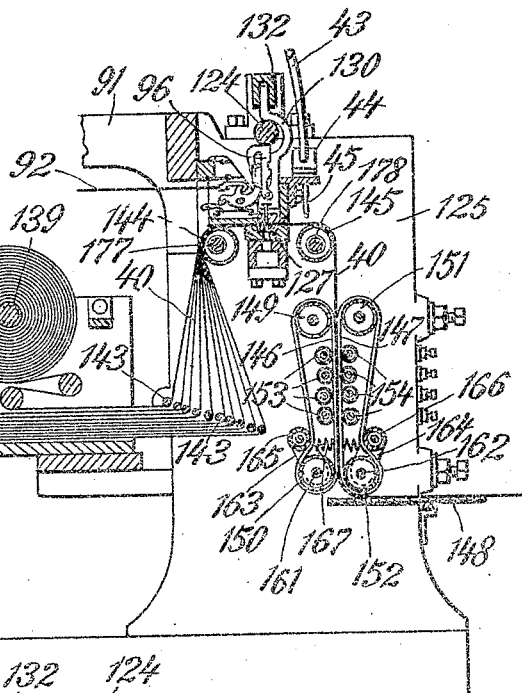
WITNESSES:
INVENTOR
H. P. Ball
BY
ATTORNEY

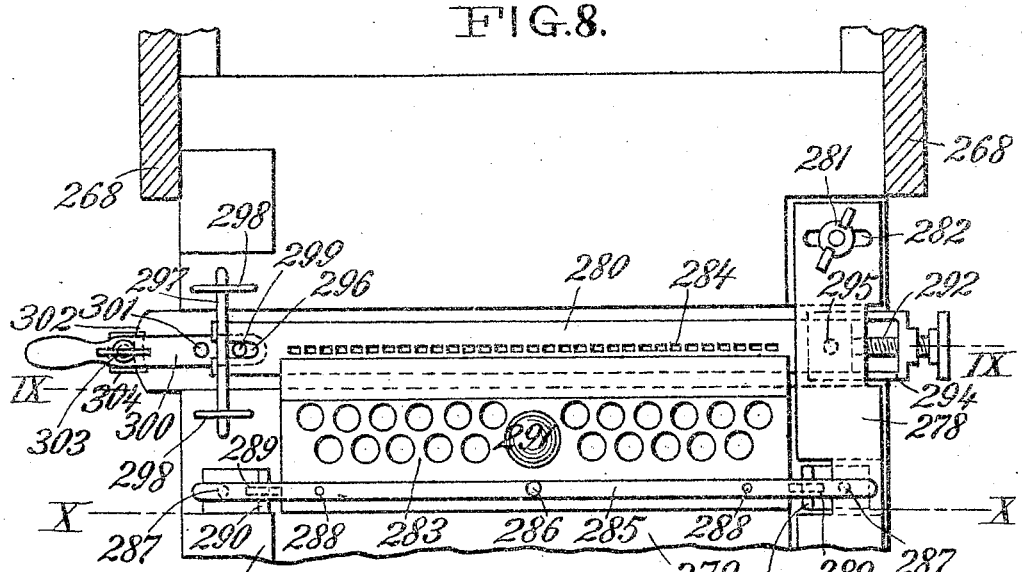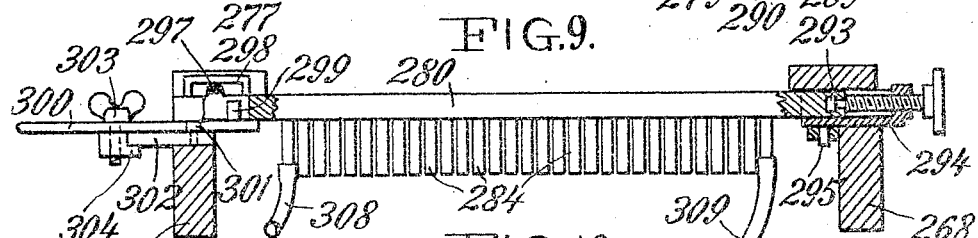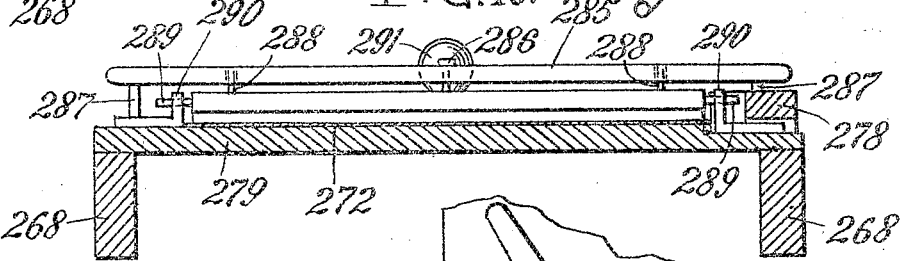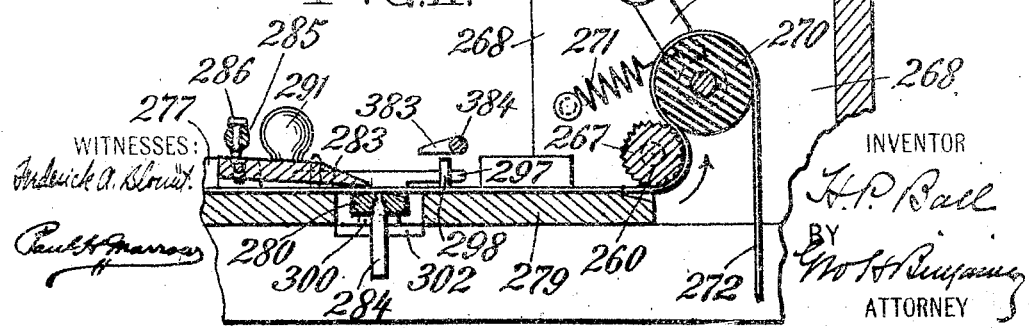

H. P. BALL.
APPARATUS FOR PRODUCING PERFORATED RECORDS FOR AUTOMATIC PIANO PLAYERS.
APPLICATION FILED OCT. 9, 1907.

938,452.

Patented Oct. 26, 1909.

WITNESSES:
Frederick A. Dount
Paul H. Marrow

INVENTOR
H. P. Ball
BY G. H. Benjamin
ATTORNEY

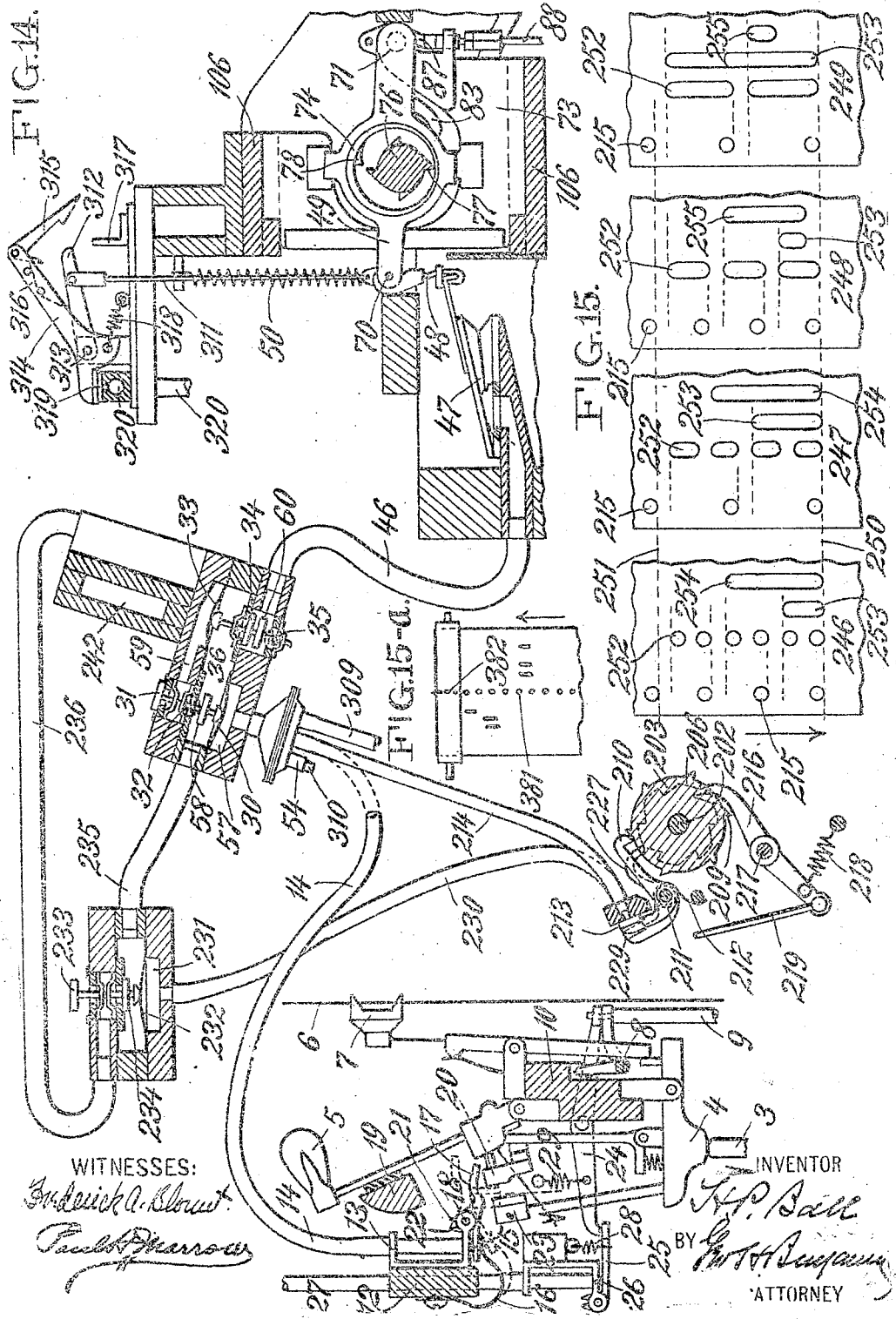

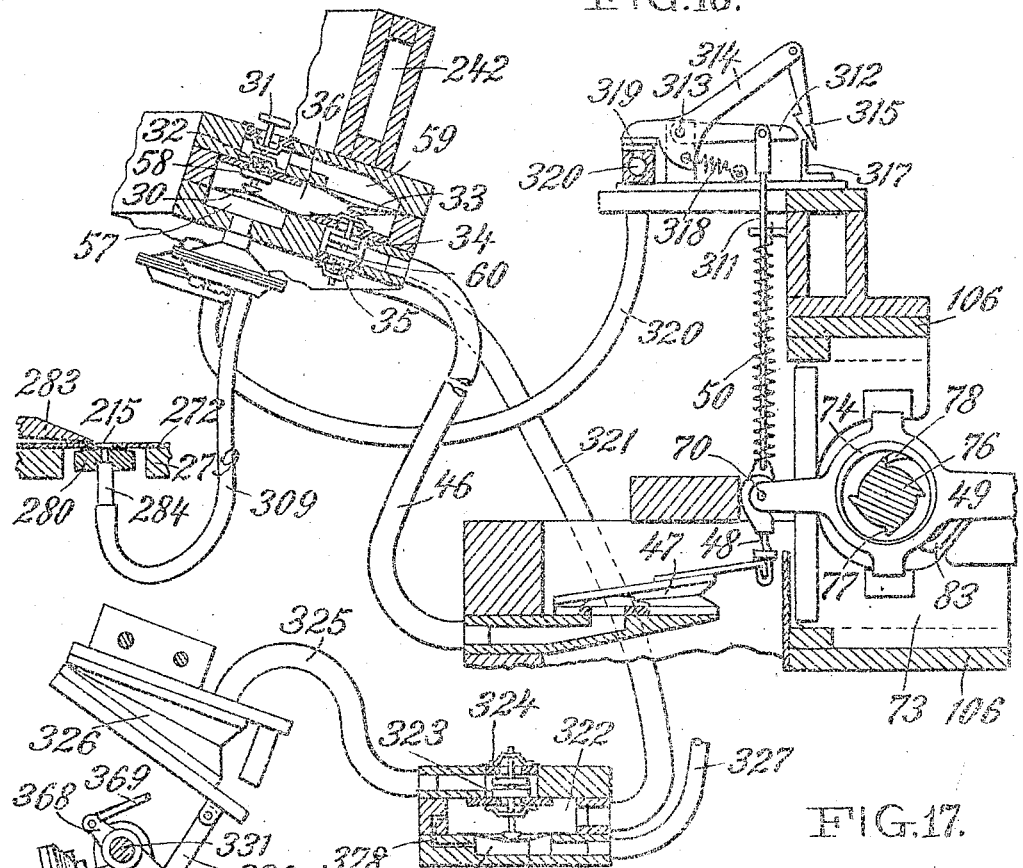
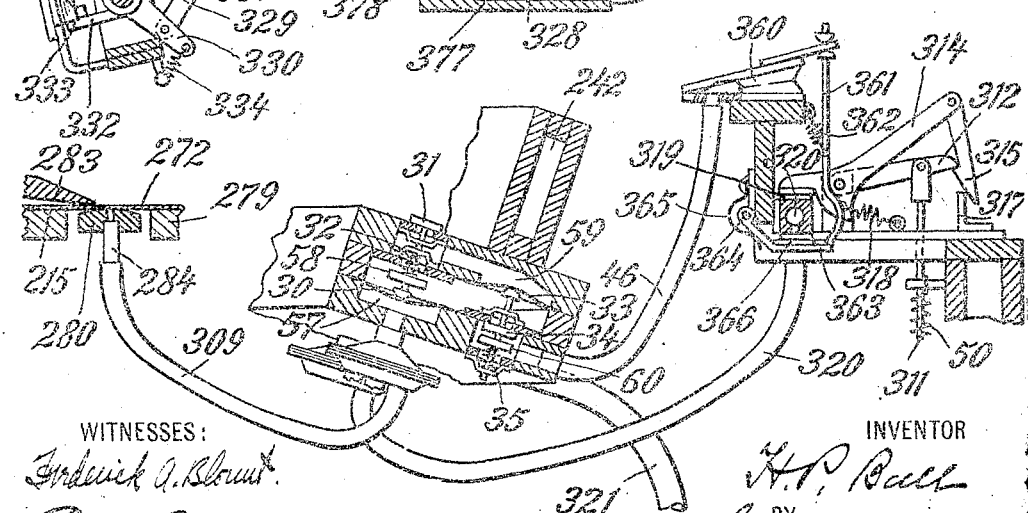

H. P. BALL.
APPARATUS FOR PRODUCING PERFORATED RECORDS FOR AUTOMATIC PIANO PLAYERS.
APPLICATION FILED OCT. 9, 1907.
938,452.
Patented Oct. 26, 1909.
16 SHEETS—SHEET 9.
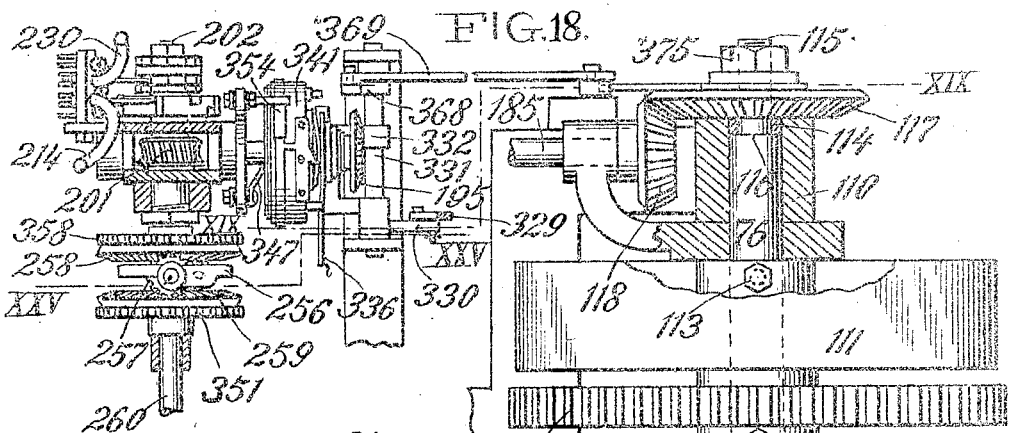
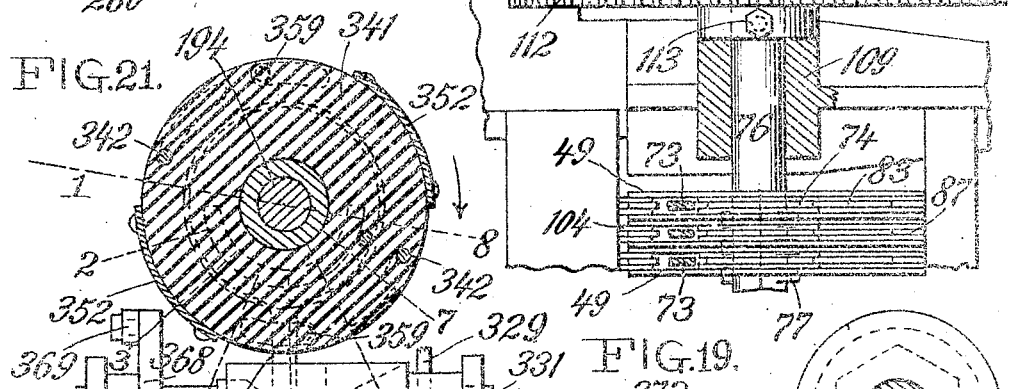
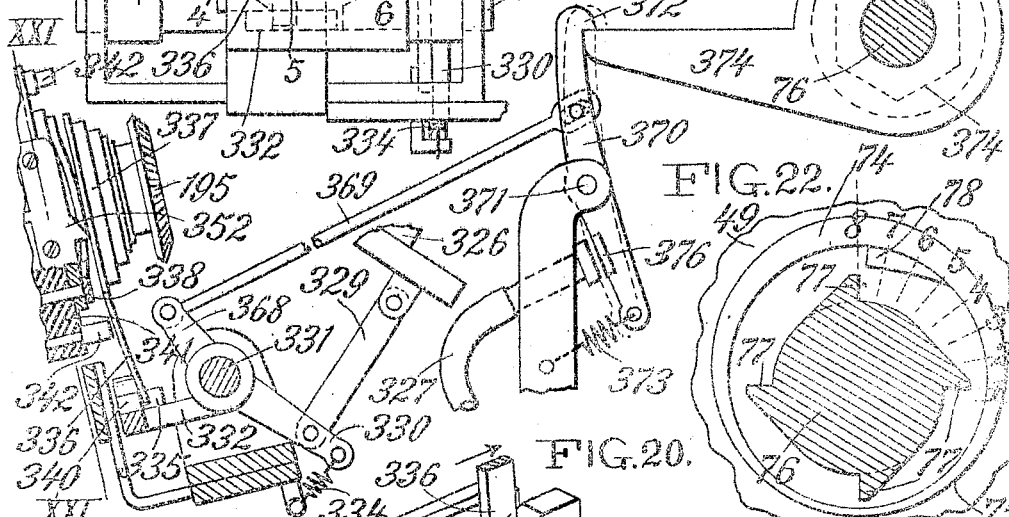
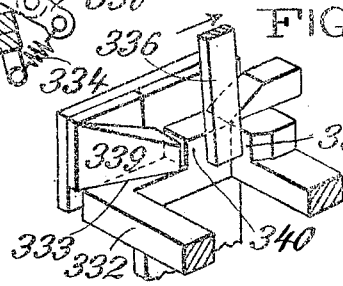

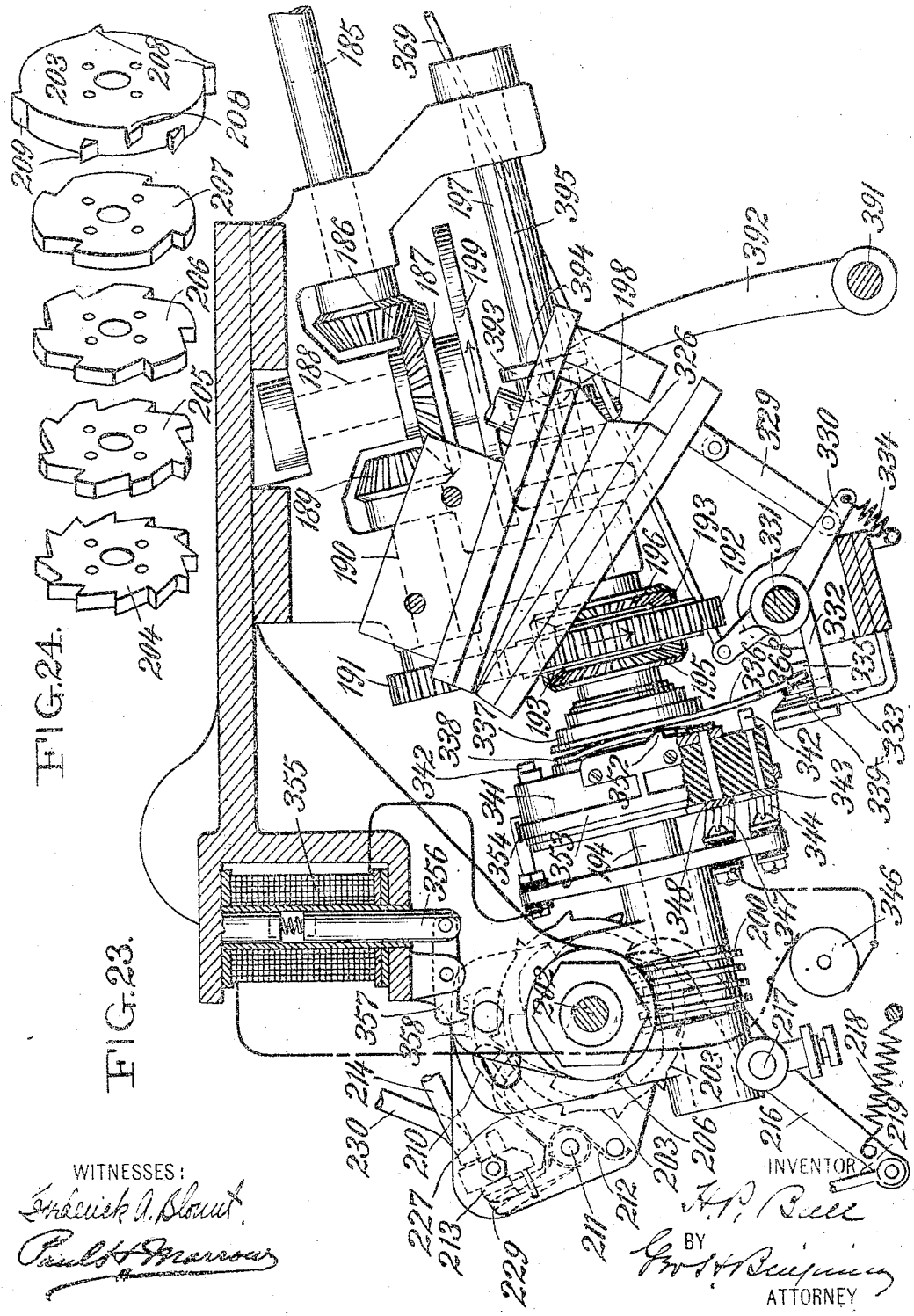

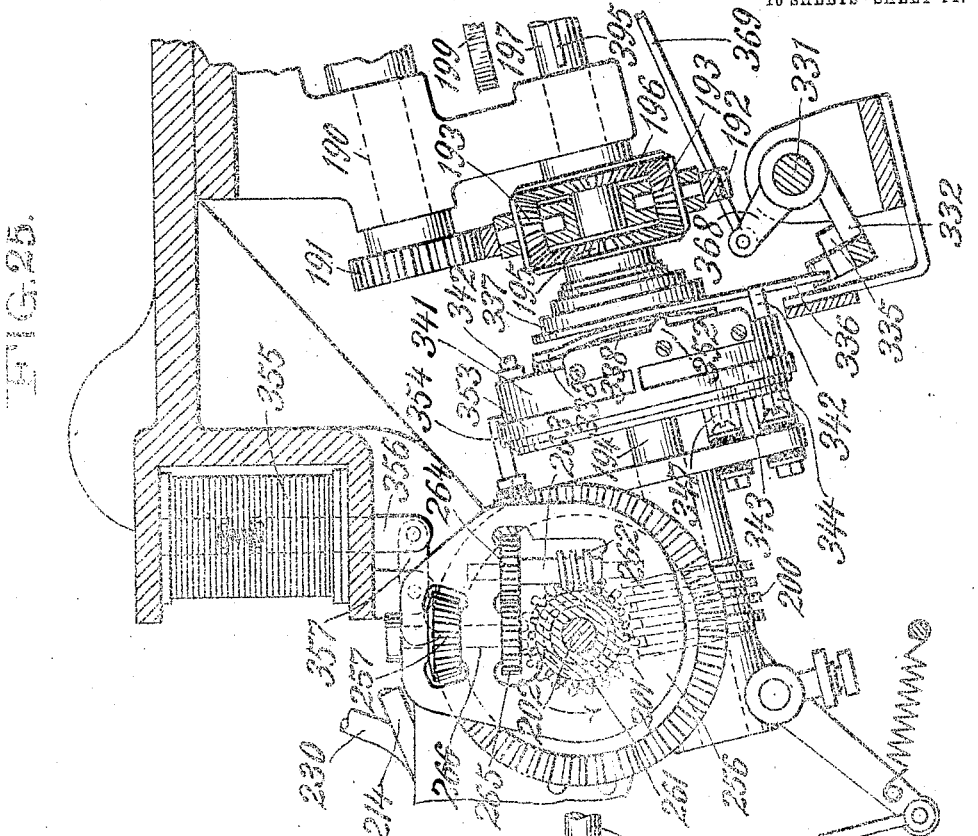

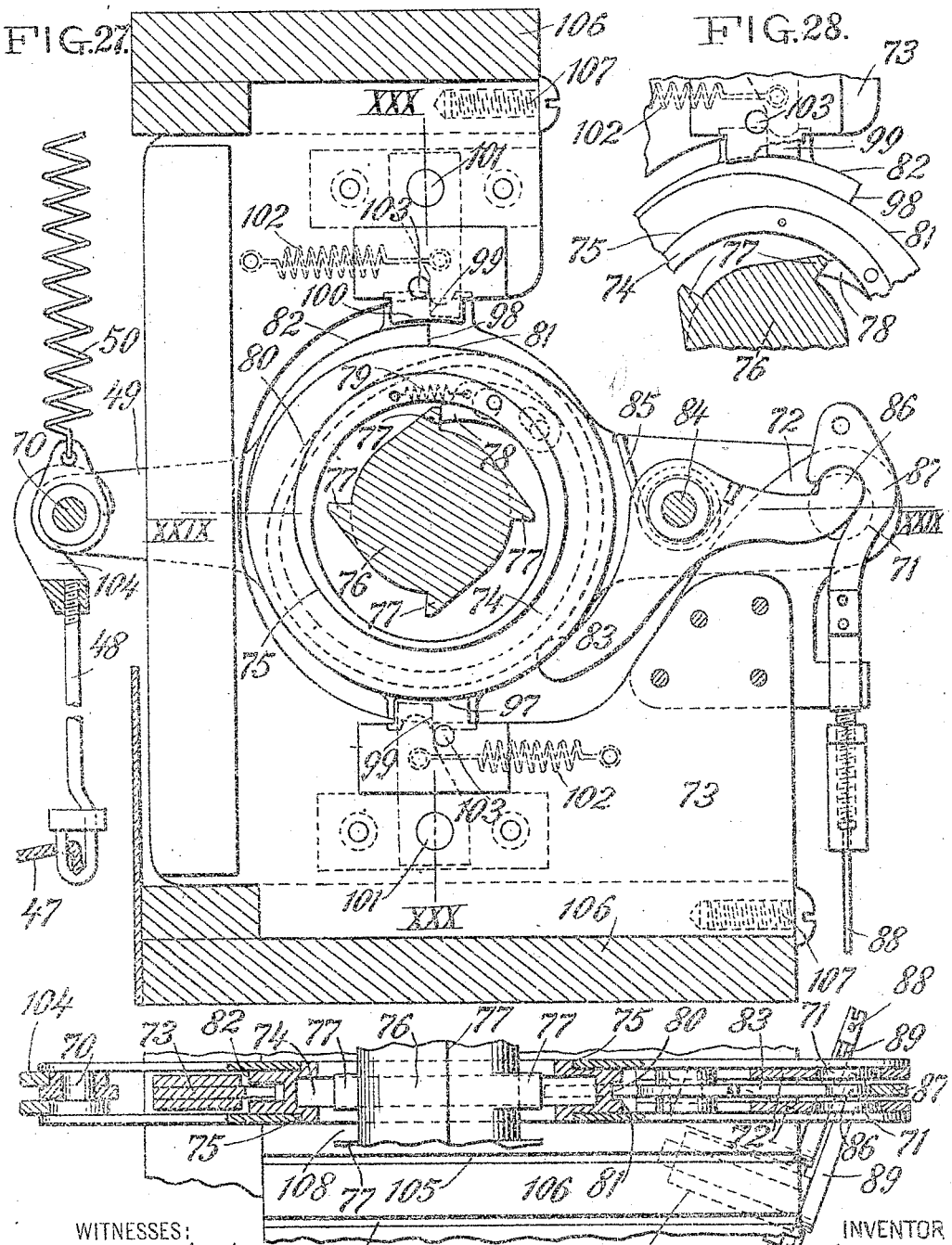

H. P. BALL.
APPARATUS FOR PRODUCING PERFORATED RECORDS FOR AUTOMATIC PIANO PLAYERS.
APPLICATION FILED OCT. 9, 1907.
938,452.
Patented Oct. 26, 1909.
16 SHEETS—SHEET 13.
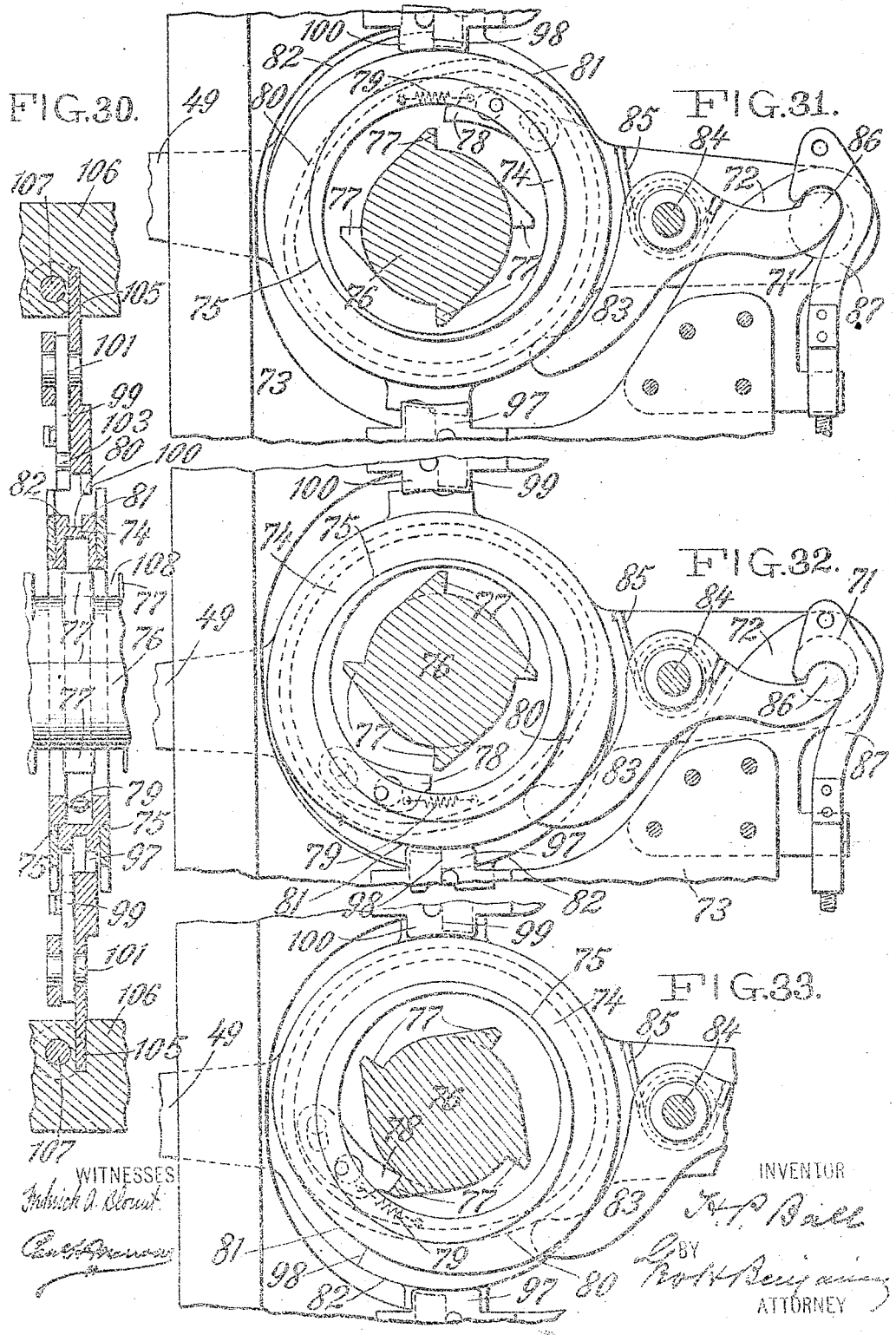

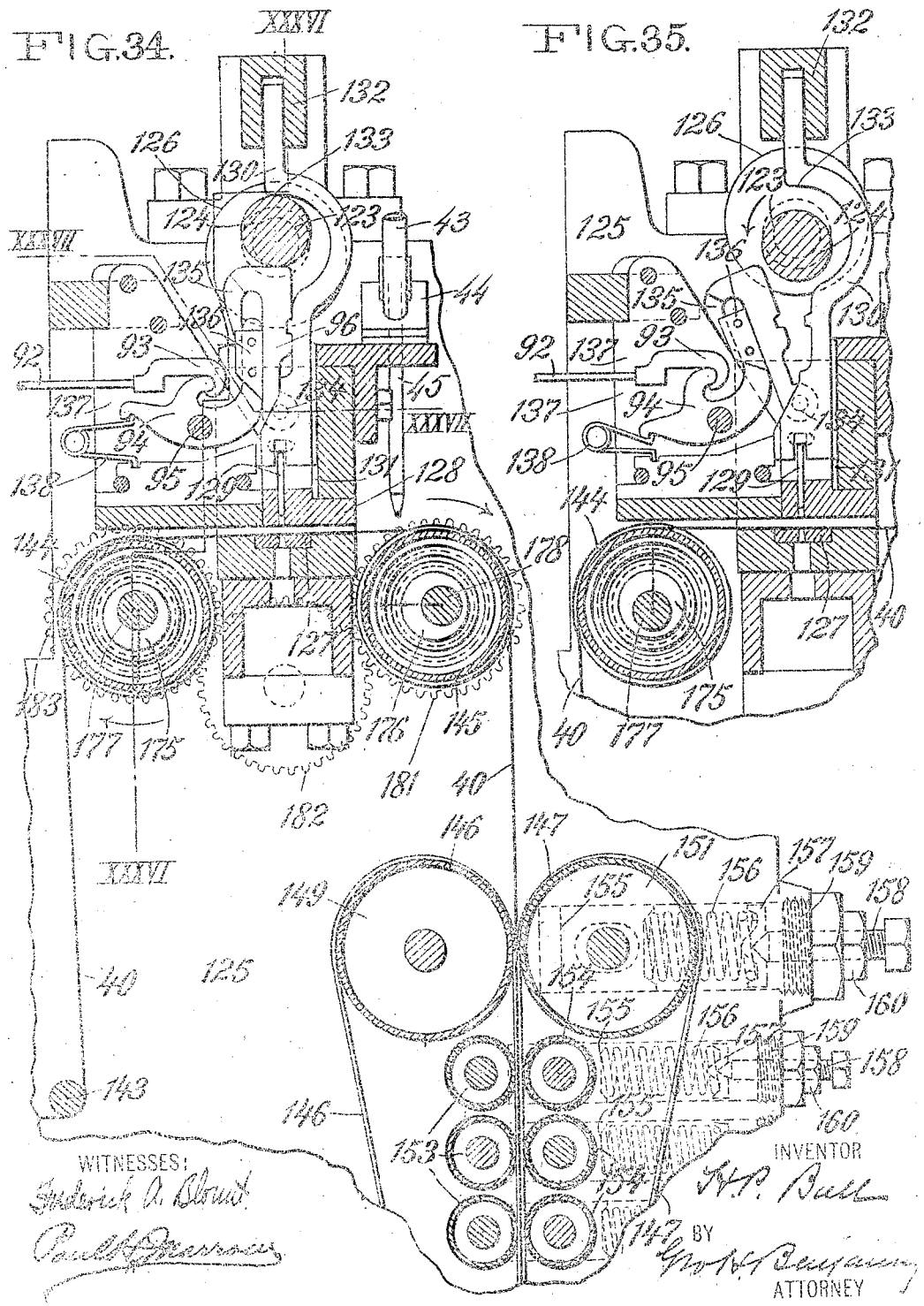

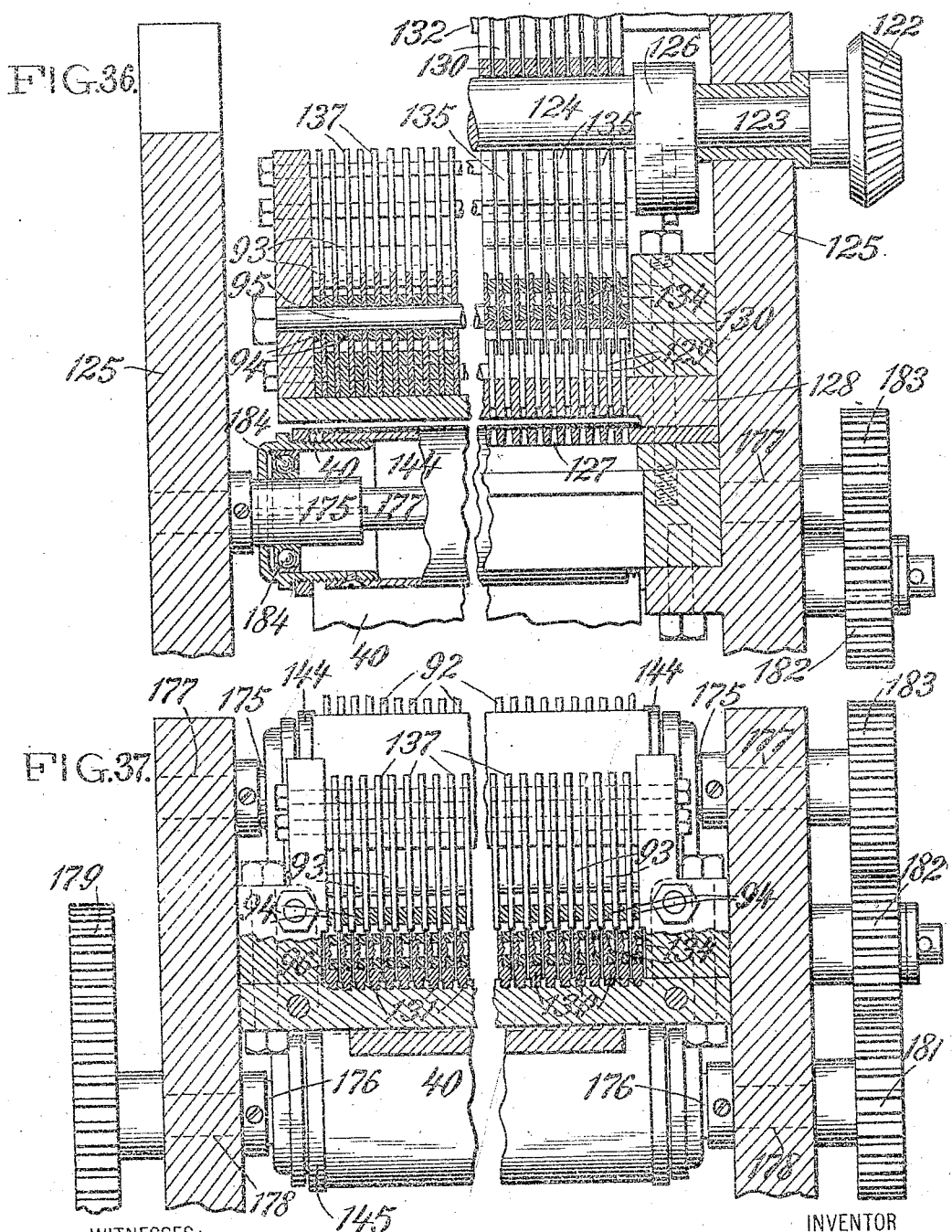

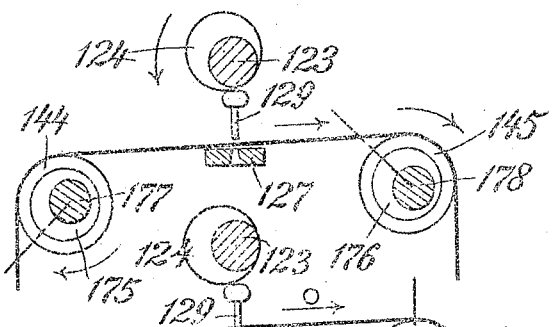
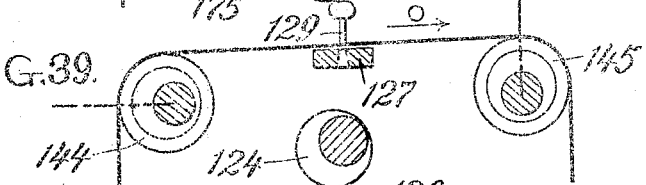
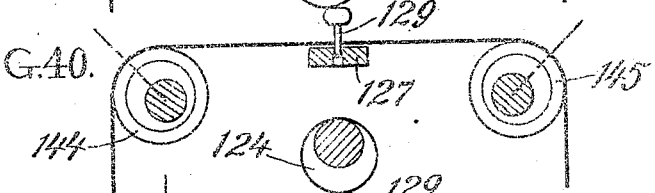
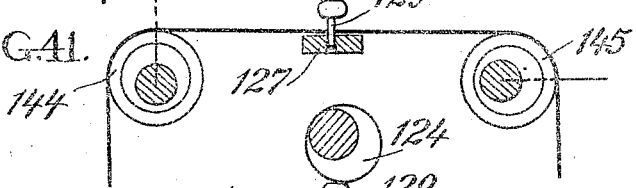
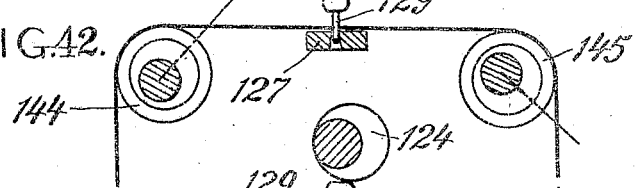
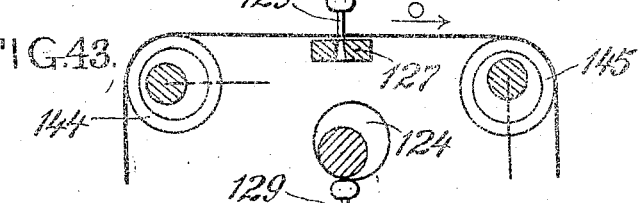
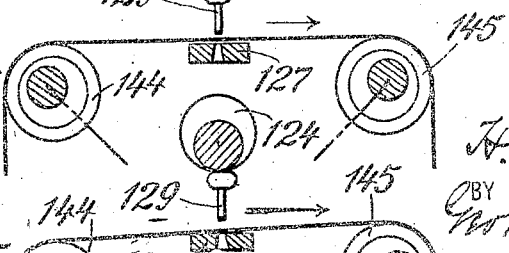

UNITED STATES PATENT OFFICE.

HENRY PRICE BALL, OF NEW YORK, N. Y., ASSIGNOR OF ONE-HALF TO SAMUEL INSULL, OF CHICAGO, ILLINOIS.

APPARATUS FOR PRODUCING PERFORATED RECORDS FOR AUTOMATIC PIANO-PLAYERS.

938,452.  Specification of Letters Patent.  Patented Oct. 26, 1909.

Application filed October 9, 1907. Serial No. 396,642.

*To all whom it may concern:*

Be it known that I, HENRY PRICE BALL, a citizen of the United States, residing at New York city, county and State of New York, have invented Apparatus for Producing Perforated Records for Automatic Piano-Players, of which the following is a specification.

This invention relates to apparatus for producing perforated records of a performer on the piano, and for making copies of such records, the copies being intended for use in automatic piano playing instruments.

The invention consists of several distinct features, as follows:—

First: Mechanism for making a record of a performance on the keyboard of a piano in the form of a perforated sheet of paper, which record when used in automatic piano players, will reproduce the same musical effect as was originally produced by the performer at the time the record was made.

Second: Mechanism for actuating and controlling selecting devices to be thrown into engagement with mechanism actuating the punches for perforating the paper.

Third: Punch selecting devices and mechanism for actuating the punches.

Fourth: Paper feeding mechanism, whereby the portion of paper being punched will be moved intermittently during a continuous forward feed of the paper.

Fifth: Mechanism whereby holes will be punched in the paper at regular distances apart, corresponding to intervals of time during which the paper travels such distances. Mechanism actuating a metronome, and a maintaining device are also used in the operation of this feature of the invention. This feature provides means for making a perforated record of a performance on the piano, which record is different in the musical result produced therefrom, from the original musical composition as played at the time the record was made. This feature also provides the improvement whereby the performer is guided in his performance, so that certain of his idiosyncracies as to tempo do not reproduce in the record.

Sixth: Mechanism actuating feed rollers which effect travel of the master sheet, produced as above described, over an adjustable tracker-board, connected to pneumatic devices actuating selecting devices, which choose the punches to be actuated.

Seventh: Mechanism whereby the master sheet will travel over the tracker-board at such various speeds as to make the time of action of the responsive devices controlled by the perforations of the master sheet, occur synchronously in time with the movement of the mechanism of the perforating machine, the regularly space holes, previously referred to, being used to actuate devices controlling the synchronizing device.

Eighth: Manually operated means for changing the speed of shafts causing travel of the master sheet. This feature provides means whereby the master sheet having perforations therein, occurring at uniform periods of time, can be modified in the copies to perforations of unequal spacing, in other words, this feature consists in taking the master in which the notes have not been phrased, and providing means for producing copies from such a master in which notes are phrased, it being understood that phrasing consists in changing temporarily the tempo of the music, either to make it go gradually or quickly, slower or faster at certain places in the music.

Figure 3:
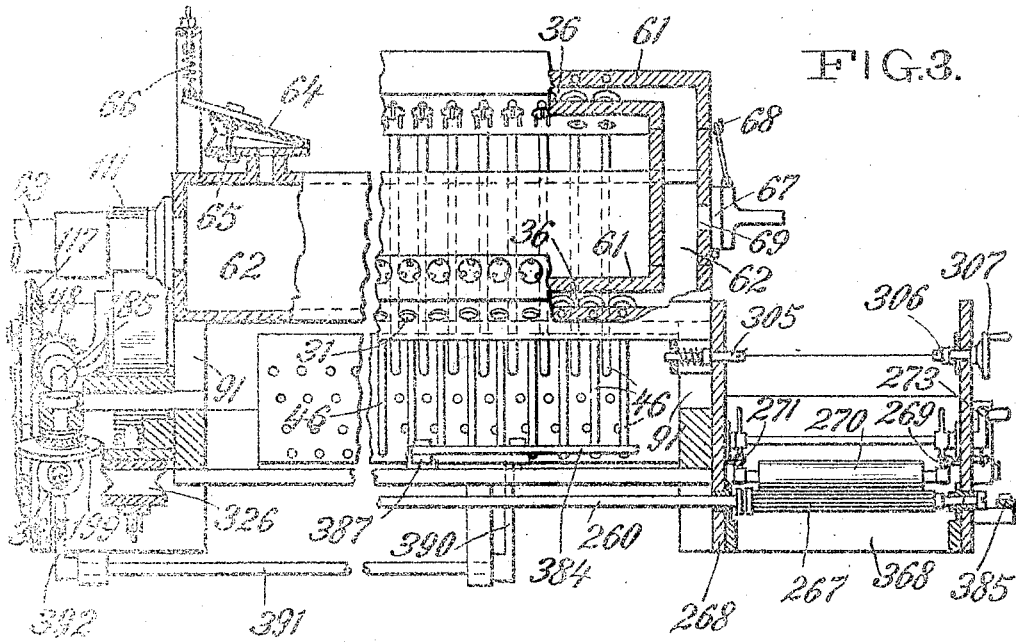
Figure 4:
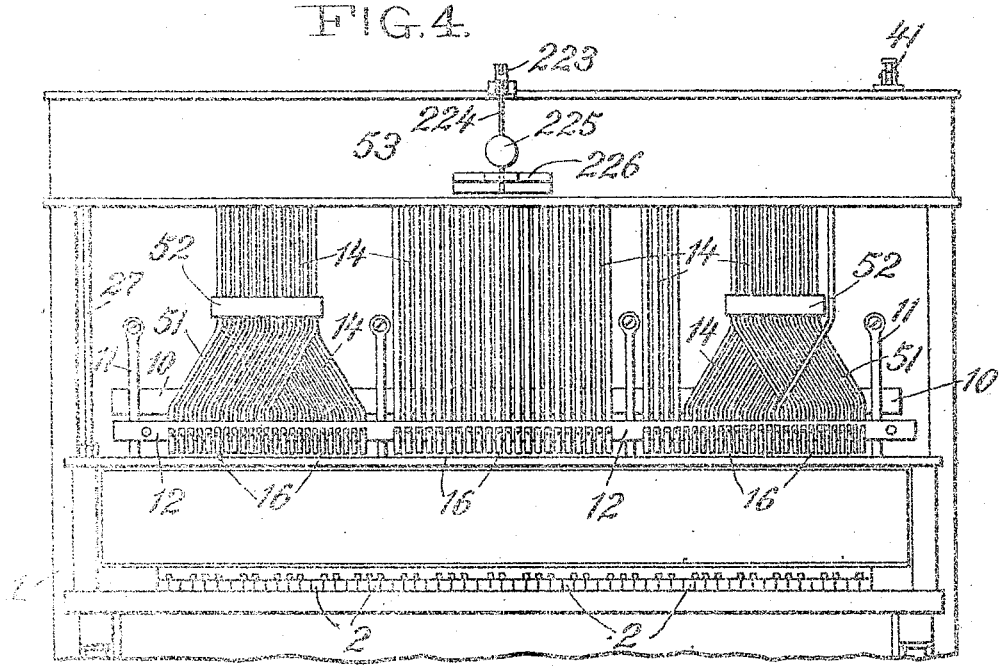

Other details in the construction are shown in the accompanying drawings, in which:

Figure 1 is a plan view of the entire apparatus; Fig. 2 is a sectional side elevation on the line II—II of Fig. 1; Fig. 3 is a cross section, approximately on the line III—III of Fig. 2; Fig. 4 is a front view of a portion of the piano, showing attachments used in the operation of this invention; Fig. 5 is a sectional elevation on the line V—V of Fig. 1, showing the mechanism used for punching and feeding the paper. Fig. 6 is a detail view of parts of the punch selecting mechanism; Fig. 7 is an elevation of the mechanism used for punching and feeding the paper; Fig. 8 is a sectional plan view of the adjustable tracker-board. Fig. 9 is a sectional view on the line IX—IX of Fig. 8. Fig. 10 is a sectional view on the line X—X of Fig. 8. Fig. 11 is a sectional view on the line XI—XI of Fig. 1. Fig. 12 is a view showing portions of the apparatus in section on the line XII—XII of Fig. 1. Fig. 13 is a sectional plan view on the line XIII—XIII of Fig. 12. Fig. 14 is a sectional view of portions of the apparatus, showing punch selecting devices responsive to the playing of piano keys, and responsive to the machine. Fig. 15 is a view showing examples of paper punched by the machine. Fig. 15ᵃ is a view showing a modified form of a master sheet. Fig. 16 is a sectional view of portions of the apparatus, showing a punch selecting device and a synchronizing device operating responsive to the travel of a synchronizing hole of a master sheet over the tracker-board. Fig. 17 is a similar view, showing a modified adjustment in which the punch selecting device is omitted. Fig. 18 is a sectional plan view showing portions of the synchronizing mechanism. Fig. 19 is a sectional elevation on the line XIX—XIX of Fig. 18; Fig. 20 is a detail perspective view of a portion of the synchronizing mechanism. Fig. 21 is a sectional view on the line XXI—XXI of Fig. 19. Fig. 22 is a detail view showing the relation of the punch controlling means to the synchronizing mechanism shown in Fig. 21. Fig. 23 is a sectional elevation on the line XXIII—XXIII of Fig. 1. Fig. 24 is a perspective view of a series of ratchet or cam disks used in the apparatus. Fig. 25 is a sectional elevation on the line XXV—XXV of Fig. 18. Fig. 26 is an elevation and partial section, showing portions of the apparatus shown in Figs. 12, 23 and 25, and devices coöperating with the series of ratchet cam-disks shown in Fig. 24. Fig. 27 is an enlarged sectional elevation of a punch selecting and controlling mechanism. Fig. 28 is a similar view showing another position of the controlling means. Fig. 29 is a sectional plan view on the line XXIX—XXIX of Fig. 27. Fig. 30 is a sectional elevation on the line XXX—XXX of Fig. 27. Figs. 31, 32 and 33 are views similar to Fig. 27, showing different positions of the punch selecting and controlling mechanism. Fig. 34 is an enlarged sectional elevation similar to Fig. 5, showing the mechanism used for punching and feeding the paper. Fig. 35 is a similar view showing another position of the punching mechanism. Fig. 36 is a sectional elevation approximately on the line XXXVI—XXXVI of Fig. 34. Fig. 37 is a sectional plan view on the line XXXVII—XXXVII of Fig. 34; and Figs. 38 to 45 inclusive are diagrammatic views illustrating the different positions of the parts during the intermittent movement of the paper.

A performer on the piano 1, will press the usual keys 2, which act upon rods 3, and wippens 4, causing hammers 5 to strike the strings 6. The dampers 7 may be moved away from the strings by means of a bar 8 actuated by a vertical rod 9 connected to the usual "loud" pedal, to assure loud and sustained tones. The wippens 4 and hammers 5 are pivoted to a bar 10, fastened to a frame 11, secured to the piano. To frame 11 is secured a bar 12, to which is fastened a series of small frames 13, having air tubes 14 attached, the ends of the tubes being provided with a valve 15, ordinarily closing the tube by means of a spring 16. Valve 15 is formed upon one end of a lever 17, pivoted at 18 to frame 13. The other end of lever 17 extends beneath the hammer rest rail 19, above and in range with stop 20 of hammer 5, so that when a hammer 5 is thrown against the string, hammer stop 20 will move upward, and striking the lever 17, cause valve 15 on the opposite end to open the tube 14. The movement of lever 17 is limited by means of a shoulder 21 on lever 17, taking against a shoulder 22 of frame 13. Immediately after stop 20 of hammer 5 strikes lever 17, back stop 23 of wippen 4, also strikes it, consequently when hammer 5 drops back away from the string, back stop 23 will continue to hold valve 15 open as long as the wippen is held up by the player pressing the keys 2.

When dampers 7 are moved away from strings 6, by means of vertical rod 9, one end of a centrally pivoted lever 24 is lifted, causing its opposite end to act upon a pivoted lever 25, having a valve 26 attached, ordinarily closing an air tube 27 by means of a spring 28. Lever 24 is held out of engagement with lever 25 by means of a spring 29. When lever 25 is actuated by lever 24, valve 26 will open tube 27, causing air to be admitted through said tube to one side of a diaphragm 30 as shown in Fig. 14. This will cause movement of the diaphragm and a primary valve 31 against the force of a spring 32, causing air to be admitted to a diaphragm 33, actuating a secondary valve 34 against the force of a spring 35. This will cause an air exhausting channel 36 to be placed in communication with a tube 37 connected to a power pneumatic 38, and cause a pencil 39 attached to said pneumatic, to be moved into engagement with one margin of the paper 40, which is being punched. It will be evident that by this means a line will be produced upon the paper during the time the "loud" pedal is used. For convenience, the position of primary valves 31, secondary valves 34 and their coöperating parts, is sometimes reversed with reference to the channel 36; e. g., in Fig. 7, primary valve 31 is fitted to the lower side of channel 36, and secondary valve 34 is fitted to the upper side, whereas in Fig. 14, primary valve 31 is shown fitted to the upper side of channel 36 and secondary valve 34 is shown fitted to the lower side.

A spring closed valve 41, is manually operated, causing air to be admitted through a tube 42 to one side of another diaphragm 30, actuating a primary valve 31, causing a secondary valve 34 to be operated. This will cause air exhausting channel 36 to be placed in communication with a tube 43, connected to a power pneumatic 44, and cause a pencil 45 to be moved into engagement with the other margin of the paper 40. This will produce a line upon the paper for purposes of recording peculiarities of playing, such as accentuations of certain chords, etc.

When movement of hammer 5 and hammer stop 20 causes lever 17 to open valve 15, air will be admitted through tube 14 to one side of another diaphragm 30, actuating a primary valve 31, causing a secondary valve 34 to be operated. This will cause air exhausting channel 36 to be placed in communication with a tube 46 connected to a power pneumatic 47, and cause downward movement of a rod 48 connecting said power pneumatic to a punch selecting lever 49, held up by means of a spring 50.

As the punch selecting levers 49 may be less in number than the piano keys 2, the valves and power pneumatics actuating said levers are also less in number, and the air inlet valves 15 operating in response to piano keys 2 above the limited number are connected by short tubes 51 to blocks 52 in communication with corresponding tubes 14 connected to valves 15, operating in response to keys 2 an octave below. The air inlet valves 15 operating in response to piano keys 2 below the limited number, are connected by short tubes 51 to blocks 52 in communication with corresponding tubes 14 connected to valves 15 operating in response to keys 2 an octave below.

From blocks 52 and valves 15 responsive to keys 2 located at the middle of the keyboard, the tubes 14 are carried through a box 53 on top of the piano, and connected to one of three nipples 54 communicating with a chamber 55, on one side of a perforated strainer plate 56. The air admitted to tubes 14 after passing through the strainer plate 56, is admitted to a chamber 57 on one side of a diaphragm 30, actuating primary valve 31. When valve 31 is closed, a valve 58, attached to the stem of valve 31 is open, causing a chamber 59 to be placed in communication with air exhaust channel 36. When valve 31 is opened by the admission of air to one side of diaphragm 30, chamber 59 will be shut off from exhaust channel 36 by means of valve 58, and valve 31 being open, air will be admitted to chamber 59 on one side of diaphragm 33 actuating secondary valve 34. When valve 34 is closed, a valve 60, attached to the stem of valve 34, is open, causing air to be admitted through tube 46 to power pneumatic 47. When valve 34 is opened by the admission of air to chamber 59 on one side of diaphragm 33, valve 60 will be closed, and tube 46 will be placed in communication with exhaust channel 36. Owing to the size and number of primary and secondary valves required, four casings 61, containing said valves and air exhausting channel 36 are attached to an air exhausting chamber 62, from which the air is exhausted through a tube 63 connected to an air pump (not shown). By means of a bellows 64 actuating a valve 65, if the exhaust becomes too high in chamber 62, said exhaust acting against the force of spring 66 will cause the bellows to collapse, and by opening a valve 65 admit air to chamber 62. If desired, the operator can kill the exhaust by releasing a pivoted valve 67 from a hook 68, when air will be admitted to chamber 62 through an opening 69.

Mechanism used in combination with punch selecting levers 49, constitutes the second feature of the invention. Punch selecting lever 49 consists of two side plates having a pin 70 at one end, to which spring 50 and rod 48 are connected. The opposite end of each of the side plates 49 has a projection 71 fastened thereon which forms a fulcrum bearing in a plate 72, riveted to the main supporting plate, 73. At the center of lever side plates 49 is placed an annular rotating cam 74, having a bearing 75 on each side in side plates 49. Cam 74 is actuated by a continuously rotating shaft 76, extending through the center of the series of cams. Shaft 76 is provided with four teeth 77 running longitudinally thereof and placed 90 degrees apart. The cam is annular in shape and has a tooth 78 pivoted to it, extending toward the center and adapted for engagement with teeth 77 of shaft 76, when the cam is moved down and up by means of lever 49. To tooth 78 is connected a spring 79 causing the tooth to move toward the center of the cam. The purpose of this is that if the cam tooth were to try to engage with a tooth 77 of the shaft at the time when the tooth of the cam was immediately over the tooth of the shaft, so that the cam tooth could not get in front of the shaft tooth, the cam tooth would be pushed back, to avoid jamming or breaking any of the parts. This is especially true if the cam tooth were to engage the shaft tooth and not to do so by its full overlap, but were to engage at the corners of the teeth, for example, without any lap, except just enough to make the cam travel, in which event, if the tooth were not loosely supported in the cam, the tooth would be broken if forced around by the shaft. The cam is provided with three cam surfaces, a center one 80, a surface 81 on one side of 80 and another one 82, on the other side. The center cam surface 80 is for the purpose of actuating an arm of a bell-crank 83, so that every time the cam makes one complete revolution, the bell-crank arm is moved toward the center of the cam and out again, and this movement takes place during an angular travel of the cam of a little over 90 degrees, for purposes hereinafter specified.

Bell-crank 83 is pivoted at 84 to lever 49, one arm of the bell-crank being held against cam 74 by means of a spring 85. The other arm of bell-crank 83 is provided with a pivot 86 coupled with a hook 87 occupying a position approximately on a line with the axis of fulcrum 71 of lever 49. By this means, pivot 84 of the bell-crank can be moved up and down by lever 49 without disturbing the bell-crank, for the reason that the bell-crank can turn on the pivot 86 while the lever 49 turns upon the pivot 71. Attached to hook 87 is a wire 88 connected to a bell-crank 89, pivoted at 90 to a frame 91 supporting the plates 73. Bell-crank 89 is connected by a wire 92 to a hook 93, coupled to a lever 94, pivoted at 95, actuating a punch selecting latch 96.

In Fig. 27 the cam is shown as having just been pulled down by the power pneumatic, causing tooth 78 to engage a shaft tooth 77. It will be seen that cam surface 81 is resting upon a stop 97, and a shoulder 98 forming part of cam surface 82, is disengaged from a yielding stop 99. In Fig. 28, the cam is shown as having just started in its travel. It will be seen that in Fig. 28, cam surface 82 has passed under the yielding stop 99, so that, if for any reason the power pneumatic should become deënergized a very short interval after it has actuated the cam, the cam will still continue in motion for at least 360 degrees, just prior to which time a cut away portion of cam surface 81 will allow it to move upward against a stop 100 to its initial position. During this revolution of the cam, the cam surface 80 will permit the bell-crank arm 83 to move toward the center of the cam and be moved out again. This results in wire 88 being slackened and maintaining the punch mechanism in perforating operation only during the time the bell-crank arm is moved toward the center. Stops 97 and 100 are similar, and serve the double purpose of stops limiting the up and down movement of the cam, and as bearings for the cam to rotate upon. The yielding stop 99 consists of a lever pivoted at 101 to plate 73, and is made yielding by means of a spring 102. If the cam is started in motion and the power pneumatic is pulling it down at the time the cam has run 180 degrees, then the cut away portion of cam surface 81, riding on stop 97, will permit the cam to move from the position shown in Fig. 27 to the position shown in Fig. 32. Tooth 78 will then be disengaged from the tooth 77 of shaft 76, and the cam will remain in the position shown in Fig. 32 until the power pneumatic releases it. In this case the cam surface 80 will permit the bell-crank 83 to move toward the center of the cam and remain there as long as the cam is stationary. This results in wire 88 being slackened and maintaining the punch mechanism in perforating operation during this time as hereinafter described. When the power pneumatic releases the cam, the tooth 78 will engage the driving shaft, as shown in Fig. 33. Cam surface 81 then comes in contact with stop 100, and continues to hold lever 49 in the position shown in Fig. 33, until the cut away portion permits it to be moved to the position shown in Fig. 31. Tooth 78 will then be disengaged from the tooth 77 of shaft 76, and the cam will remain in the position shown in Fig. 31, until it is again moved down by a power pneumatic. When tooth 78 is disengaged from the shaft tooth 77, rotation of the cam is stopped by means of lever 99, which takes against shoulder 98 of cam surface 82. Spring 102 takes the shock, permitting lever 99 to yield and moving it back to its normal position against a pin 103. A similar yielding stop 99 is provided for checking the rotation of the cam when tooth 78 is disengaged from the shaft tooth 76 at the end of the downward movement of the cam, as shown in Fig. 32.

Plate 73 stands between the side plates of lever 49, and is a guide and support for the side plates and taken in connection with the parts operating in combination with the cam, constitutes a unit, capable of removal, on withdrawing the driving shaft, disconnecting hook 87 from bell-crank 83, and disconnecting a hook 104, attached to rod 48 from lever 49. The upper and lower end of each plate 73 is fitted to slots 105 formed in plates 106 attached to frame 91. The plates 73 are held in place by means of screws 107.

In some instances where it is desirable to have a greater length of time to elapse between successive recorded perforations, means may be provided whereby the shaft 76 can rotate at a slower speed. Or on the same shaft we can have two teeth instead of four, by making a cut 108, of opposite teeth 77 at intervals, and by shifting the shaft longitudinally a short distance, bring the two teeth or four teeth into engagement with the cam teeth.

Toothed shaft 76 is mounted at each end in bearings 109, forming part of frame 91, and between a bearing 109 and an outer bearing 110, is a drive pulley 111 and a gear wheel 112 secured to shaft 76. By loosening the bolts 113, shaft 76 can be moved longitudinally a distance determined by the width of a bushing 114, and the bolts 113 can then be tightened to fasten drive pulley 111 and gear wheel 112 to the shaft. The end of shaft 76 is provided with a portion 115 of less diameter than the shaft, and bushing 114 is fitted over this reduced portion against a shoulder 116, a bevel gear wheel 117 is secured to the reduced portion 15 outside of the bushing. Then in adjusting shaft 76 longitudinally, in order that bevel gear wheel 117 shall not be changed in its relation to the bevel gear wheel 118 in mesh with it, bushing 114 will be removed and bevel gear wheel 117 will be fitted against the shoulder 116.

In mesh with gear wheel 112, is a gear wheel 119, half its diameter, secured to a shaft 120, which actuates mechanism used in the operation of the third feature of the invention. Secured to shaft 120, is a bevel gear wheel 121, in mesh with a bevel gear wheel 122 half its diameter, which is secured to a shaft 123, having an eccentric middle portion 124. It will be readily seen that the gearing is so proportioned that shaft 123 will make four revolutions while shaft 76 is making one.

Shaft 123 rotates in bearings on a frame 125 attached to frame 91. Secured to shaft 123 are counterweights 126 balancing the weight of eccentric shaft 124, thereby reducing the vibration due to the shaft's eccentricity. Attached to frame 125 is a die plate 127 and a plate 128, in which a series of punches 129 have vertical movement. The paper 40, which is to be punched, passes between die plate 127 and the series of punches 129. Punch 129 is attached to a carrier 130, the lower end of which moves in vertical guides 131, the upper end moving in a guide formed on a cross bar 132. The center part of carrier 130 is made semicircular in shape, a shoulder 133 being formed thereby. Eccentric shaft 124 rotates within the semi-circular part of carrier 130, and by taking against the shoulder 133, lifts the carrier and the punch 129. Latch 96 is pivoted at 134 to the lower end of carrier 130, the latch normally occupying the position shown in Fig. 35. The latch is provided with a hook 135 in engagement with a finger 136 forming part of lever 94. The latch is actuated by lever 94, controlled by wire 92, as described before in the operation of the controlling mechanism. There is a lever 94, latch 96 and punch carrier 130 for each punch selecting lever 49. Lever 94 is pivoted between plates 137 on a bolt 95 and is held in the position shown in Fig. 34 by a spring 138.

When there is no punching taking place, the parts occupy the position shown in Fig. 35. When any punch is selected to operate, the wire 92 is slackened by the cam, as previously described, and this causes the latch 96 to assume the position shown in Fig. 34. Owing to the fact that shaft 124 and the slow speed shaft 76, are geared together, so that shaft 124 makes four revolutions to one revolution of shaft 76, and the cam surface 80 is peculiarly shaped, the latch 96 assumes the position shown in Fig. 34 at the time when the eccentric shaft 124 is rotating, in the direction of the arrow, from its bottom position, shown in Fig. 35 to its upper position shown in Fig. 34. It will be readily seen that as the eccentric shaft 124 rotates 180 degrees farther, the latch 96 is forced downward and carries with it the carrier 130, which in turn presses the punch 129, which passing through the paper 40, causes a round hole to be punched in the paper.

As the eccentric shaft continues beyond 180 degrees, the carrier 130 is raised and with it, the punch 129. If during this operation, the power pneumatic 47 has released the cam, so that it rises from the position shown in Fig. 27 to its initial position shown in Fig. 31, then the cam surface 80 presses the bell-crank arm 83 outward away from the center, and pulls the wire 92 taut, causing the latch 96 to assume the position shown in Fig. 35, so that during the next revolution of the eccentric shaft, the latch is out of engagement therewith and no further punching takes place. It will, therefore, be seen that if the cam shown in Fig. 27 makes one continuous revolution, there is a single round perforation produced in the paper.

In the event of the power pneumatic holding the cam down for a period of time equal to one-half of a revolution of the cam, then the cam will stop rotating, as shown in Fig. 32, and this will cause the latch 96 to remain in the position shown in Fig. 34. At every revolution of the eccentric shaft, a perforation of the paper will then take place, and this will continue until the power pneumatic releases the cam and allows it to rotate to its initial position. The successive punch operations caused by successive revolutions of the eccentric shaft, produce slots in the paper, owing to the fact that the increment of feed of the paper is less than the diameter of the punch. This causes the holes to run together to form a slot with a serrated edge. If, however, the cam shown in Fig. 27 makes continuous revolutions in unison with the slow speed shaft 76, then it will be seen that the round perforation will be produced in the paper and that successive perforations will not run into each other, but will occur with bridges between them, ordinarily equal to their own diameter. In other words, a succession of individual perforated holes is caused by the cam engaging with the slow speed shaft, and continuing in rotation with it, whereas a series of interconnected perforations forms a slot, which is caused by the cam stopping at 180 degrees of its travel and holding the latch 96 in engagement with the eccentric shaft for a number of successive revolutions.

Inasmuch as it is desired to be able to produce a perforation in the paper during any revolution of the eccentric shaft, the slow speed shaft 76 is provided with the four teeth 77, and its speed of revolution being one-fourth of the eccentric shaft, each tooth, therefore, represents a revolution of the eccentric shaft. In other words, while a tooth is passing through 90 degrees of slow speed shaft 76, the eccentric shaft is making one complete revolution. It is readily seen, therefore, that the particular tooth that the cam engages with, determines exactly the particular revolution of the eccentric shaft, which is to do the perforating. Assuming that the cam is making one continuous revolution, starting from the position shown in Fig. 27, during the first 90 degrees of movement of the cam, the latch 96 remains in the position shown in Fig. 35, but while the cam passes from 90 degrees to 180 degrees, the latch assumes the position shown in Fig. 34. As the cam continues from 180 degrees to 270 degrees, the latch returns to the position shown in Fig. 35, and as the cam passes from 270 degrees to 360 degrees, the latch remains in the position shown in Fig. 35. It is, therefore, seen that the latch passes into its position to engage the eccentric shaft, during the time the cam is passing from 90 degrees to 180 degrees, and the actual time the latch is in motion is short of approximately 90 degrees of travel of the cam. It will, therefore, be readily seen that while the cam is passing through a total of 270 degrees, there is no punching action taking place, and it is during this time that the paper is feeding forward three increments, there being an increment of feed for each revolution of the eccentric shaft. These three increments of the feed of the paper form a bridge between the perforations, equal to its own diameter, due to the fact that the feed is arranged to produce this travel of the paper.

Mechanism for feeding the paper constitutes the fourth feature of the invention.

A number of rolls of paper 40 are mounted by the shafts 139 in a trough 140. The paper is passed from each of the rolls forward over a roller 141, then back over a roller 142, and then forward along the bottom of the trough to a roller 143, from which it is carried up and over a roller 144, receiving the several thicknesses of paper. From roller 144 the paper passes between die plate 127 and punch 129, over a roller 145, and down between two endless uninterruptedly traveling belts 146 and 147. From between belts 146 and 147, the paper is delivered upon a horizontal plate 148. Belt 146 passes over rollers 149 and 150, and belt 147 passes over rollers 151 and 152. The paper 40 and belts 146 and 147 pass between two series of rollers 153 and 154. The shafts of rollers 151, 152 and 154 are mounted in adjustable bearings 155, so that said rollers can be adjusted to suit the thickness of paper passing between the belts 146 and 147. Resting against bearing 155 is a spring 156, against which a washer 157 is forced by an adjusting screw 158. Adjusting screw 158 passes through a screw plug 159, and is held in place by a jam nut 160. By removing plug 159, the bearing 155, spring 156 and washer 157 can be removed from frame 125.

Pivoted on shafts 161 and 162 of rollers 150 and 152 are corresponding arms 163 and 164 carrying rollers 165 and 166, bearing against the outer run of belts 146 and 147. By means of a spring 167, connected to arms 163 and 164, the rollers 165 and 166 are held against the belts 146 and 147, thus keeping the belts taut. Secured to shaft 161 is a worm wheel 168, which is driven by a worm 169 fastened to a vertical shaft 170. To the upper end of vertical shaft 170 is secured a bevel gear wheel 171, in mesh with a smaller bevel gear wheel 172, secured to shaft 120 by which it is driven. To shaft 161 is secured a gear wheel 173 in mesh with a gear wheel 174 fastened to shaft 162. By this means shaft 162 will be driven by shaft 161, so that roller 152 will drive the belt 147 while roller 150 drives the belt 146. By means of the friction of the belts 146 and 147 against the paper, continuous downward movement is imparted to the paper passing from roller 145. The two rollers 144 and 145 are mounted on corresponding bearings 175 and 176, upon which they are rotated by the advancing paper. Bearings 175 and 176 are eccentrically secured to corresponding shafts 177 and 178, which are driven at the same speed as shaft 123, carrying the eccentric shaft 124. The eccentric bearings 175 and 176 are continuously rotated in the same direction that the paper 40 is traveling, as it is drawn between belts 146 and 147.

Shaft 178 carrying the eccentric bearing 176, is driven by means of a gear wheel 179 in mesh with a gear wheel 180, secured to shaft 123. Secured to shaft 178 is a gear wheel 181, in mesh with an intermediate gear wheel 182, which drives a gear wheel 183, secured to shaft 177, carrying the eccentric bearing 175. The bearing of rollers 144 and 145 on the eccentrics 175 and 176 is made in the form of a ball bearing 184, so that the rollers 144 and 145 can be easily revolved upon the eccentrics by means of the traveling paper 40.

The purpose of the eccentric bearings 175 and 176, is to produce a momentary relative cessation of movement of the portion of paper that is between the die and the punch, at every half revolution of the eccentric shaft 124. The reason for this is, that the paper must stand still with respect to the die at the time the punch enters it, or the holes would be torn. It is evident that if this portion of the paper is standing still for half the time, it must be moved forward at twice its normal speed at the time the paper is not being perforated. This is accomplished by the driven eccentrical bearings for the paper carrying rollers 144 and 145. Figs. 38 to 45 are diagrammatic views, illustrating the different positions of the eccentric bearings with respect to the eccentricity of shaft 124 and its different position in forcing the punch through the paper.

The paper feeds from left to right and is being pulled downward from roller 145 at a steady uniform speed. When rollers 144 and 145 occupy the position shown in Fig. 34, the portion of paper between the die and punch is moving at a greater speed than is caused by belts 146 and 147. This is due to the fact that the eccentric bearings 175 and 176 occupy such a position that their rotation causes the distance of the paper on the carrying rollers from the center of shafts 177 and 178, to be on the increase, and that this increase is upward away from take-up belts 146, 147, and supply roller 143.

It will be seen that if the roller 145 is moving upward, while the paper is being pulled downward by belts 146, 147, the portion of paper between the die and punch will move at a speed greater than the belts, proportioned to the upward movement of roller 145. As shown in Fig. 38, the rollers 144 and 145 are moving upward, causing the paper to continue moving, although at a reduced speed as indicated by the arrow. In Fig. 39, eccentric shaft 124 has started to move the punch downward, and upward movement of roller 145 having ceased, the paper is on the point of stopping its movement, as shown by the arrow with a circle. Upward movement of roller 144, however, still continues, serving to draw paper off from supply roller 143. The punch is nearly on the point of passing through the paper which comes to a standstill before the position shown in Fig. 40 is reached. In this position, the upward movement of roller 144 has also ceased, and while the paper is standing still, the punch has passed through the paper. From the position shown in Fig. 40, the distance of the paper from the center of shafts 177, 178, and belts 146, 147 will be decreasing, as shown in Figs. 41 and 42, during which time the paper stands still, and the punch remains in the paper. In Fig. 43, the punch has been withdrawn from the paper, which is on the point of moving, as shown by the arrow with a circle. In Fig. 44, the paper is moving, owing to the slight upward movement of roller 145. In Fig. 45, the rollers having returned to the position shown in Fig. 34, the speed of the paper is very much increased, owing to the greater upward movement of roller 145.

Secured to toothed shaft 76 is the bevel gear wheel 117, in mesh with bevel gear wheel 118, half its diameter. Bevel gear wheel 118 is secured to one end of a shaft 185, having a bevel gear wheel 186, secured to the other end. In mesh with bevel gear wheel 186 is a bevel gear wheel 187, twice its diameter, secured to a vertical shaft 188. In mesh with bevel gear wheel 187 is a bevel gear wheel 189, half its diameter, secured to a shaft 190, to which is secured a gear wheel 191. In mesh with gear wheel 191, is a gear wheel 192 twice its diameter, carrying bevel pinions 193. Secured to a shaft 194 is a bevel gear wheel 195 in mesh with bevel pinions 193 on one side of gear wheel 192. In mesh with bevel pinions 193 on the opposite side of gear wheel 192, is a bevel gear wheel 196, secured to a shaft 197. On shaft 197 is mounted a friction wheel 198 in engagement with the flat side of a disk 199, secured to vertical shaft 188. The purpose of the friction wheel 198 and disk 199, will be hereinafter described. Shaft 194 has a worm 200 secured to it, in mesh with a worm wheel 201 secured to a shaft 202, which actuates mechanism used in the operation of the fifth feature of the invention.

Shaft 202 is geared to make one revolution while the slow speed shaft 76 is making 12 revolutions. Secured to shaft 202 is a ratchet cam disk 203, and four ratchet cam disks 204, 205, 206 and 207, the purpose of which will be hereinafter described. Ratchet cam disk 203 is provided with a series of four teeth 208 and another series of six teeth 209. A lever 210 is pivoted upon a rod 211 and can be adjusted along said rod, so that an arm of the lever can engage one or the other of the series of teeth 208 or 209, as shown in Figs. 14, 23, 24 and 26, the lever being held in engagement by means of a spring 212. The other arm of the lever 210 is provided with a valve 213, ordinarily closing a tube 214. Longitudinal movement of lever 210 along rod 211 is prevented by pins 210ᵃ. In adjusting lever 210 to engage the teeth 208 or 209, it is necessary to disconnect tube 214, and connect it to a nipple in communication with a hole 214ᵃ alongside a similar hole to which tube 214 has been connected. Tube 214 is in communication with a chamber 57 on one side of a diaphragm 30, which actuates a primary valve 31 in communication with the secondary valve 34, tube 46, and power pneumatic 47, controlling a punch selecting lever 49 used for punching holes 215. The holes 215 are for the purpose of dividing the longitudinal length of paper into uniform lengths corresponding to a measure of the music, or more particularly into lengths which should fill a measure. The holes 215 are used to actuate mechanism controlling the synchronizing device, as hereinafter described.

When a person plays on the piano, the question of tempo is ordinarily left to his own judgment, and it, therefore, varies from time to time and is not a fixed function of a definite period of time. If it is desired, therefore, to have records made, every measure of which occupies a given longitudinal length on the sheet, it is necessary to limit or govern the performer in such a way that each beat or measure of the music he plays, occupies a given interval of time, which time is a function of the speed of the recording machine. In other words, every beat must correspond to a certain given number of revolutions of the slow speed shaft 76. Inasmuch as the slow speed shaft 76 of the machine determines the maximum repetition of any one note, the player must be governed thereby, taking into consideration the smallest repeated note in the musical selection to be played. For example, if the machine is running so that the slow speed shaft is making 250 revolutions per minute, the player must not exceed this repetition on any one note. In order to accomplish this, the machine is provided with a metronome device, which is actuated by means of one of the ratchet cam disks 204, 205, 206 or 207.

A lever 216 is pivoted upon a rod 217, which is adjustable so that one end of lever 216 can engage one of the ratchet cam disks 204, 205, 206 or 207. A spring 218 serves to keep the lever in engagement with the disk. The other end of lever 216 is connected by a rod 219 to one arm of a bell-crank lever 220, pivoted at 221 to box 53 on top of the piano. Connected to the other arm of bell-crank 220 is a rod 222, connected to a bell-crank 223, to which is connected a vertical rod 224, carrying a weight 225. When lever 216 drops into the notches of one of the disks 204, 205, 206 or 207, weight 225 moves downward against a shelf 226, secured to box 53, causing sounds to be produced. Any one of the disks 204, 205, 206 or 207 can be selected for the particular piece in question, this selection being governed by the style of music, or by the number of "beats" with reference to the number of perforations to be made at a given time. For example, the ratchet cam 204, having twelve teeth, if used to govern the metronome, would indicate to the performer the most rapid repetition the machine will record, as each tooth of the ratchet cam disk corresponds to a revolution of the slow speed shaft 76. Ordinarily this ratchet cam actuates the metronome too fast for practicable purposes, and a disk with a fewer number of teeth would be used, such as 205, 206 or 207. Disk 205 has eight teeth, disk 206 has six teeth and disk 207 has four teeth. In playing a march or waltz, the ratchet cam disk 206, is usually used for the metronome, and at this time, the series of six teeth of ratchet cam disk 203 is used, causing holes 215 to be punched. On the other hand, if there are triplets to be taken care of, the four tooth ratchet cam disk 207 is used for actuating the metronome, and in this case the series of four teeth of ratchet cam disk 203 is used, causing holes 215 to be punched. If a piece is slow in its movement, such as religious pieces, and pieces of a great number of repeats per minute, then it is necessary to have a longer section of paper per measure, in which case the ratchet cam disk 206 or 207, is used, according to whether there is one "and" after the "beat," or whether the piece is written without or with repeated "triplets" respectively.

A lever 227 is pivoted upon rod 211 and can be adjusted along said rod so that an arm of the lever can engage one of the ratchet cam disks 204, 205, 206 or 207, as shown in Figs. 14 and 26, the lever being held against the disks by means of a spring 228. The other arm of lever 227 is provided with a valve 229, ordinarily closing a tube 230. Longitudinal movement of lever 227 along rod 211 is prevented by pins 227ª. In adjusting lever 227, to engage one of the ratchet cam disks 204, 205, 206 or 207, it is necessary to disconnect tube 230, and connect it to a nipple in communication with one of a series of holes 230ª placed alongside each other, to one of which holes the tube 230 has been connected. Tube 230 is in communication with a chamber 231, on one side of a diaphragm 232, which actuates a primary valve 233, 234, operating in combination with an air exhausting tube 235, in communication with exhaust channel 36. The opening of valve 233 causes the admission of air through a tube 236 to a chamber 237 on one side of a diaphragm 238, which actuates a secondary valve 239, 240, operating in combination with an air exhausting chamber 241 in communication with exhaust channel 36. Secondary valve 239, 240 controls admission to and exhaust of air from a channel 242, extending alongside a series of the primary and secondary valves responsive to the playing of the piano keys previously referred to.

Channel 242 is in communication by a series of tubes 243 with the chambers 57 on one side of diaphragm 30, which actuates primary valve 31. Each tube 243 communicates by means of a duct 244 with chamber 59 on one side of diaphragm 33, which actuates secondary valve 34. The junction of tubes 243 with ducts 244 in channel 242 can be closed to each other by means of a diaphragm 245, which if air is admitted by secondary valve 240 to channel 242 will close the tubes 243 and ducts 244. If air is shut off from channel 242 by closing of secondary valve 240 and secondary valve 239 opened, the air will be exhausted from channel 242, causing the diaphragm 245 to open tubes 243 and ducts 244. Tubes 243 and ducts 244 will then be in communication and permit air admitted because of an open primary valve 31 to enter tube 243 and chamber 57 below diaphragm 30 of the valve, and consequently keep the air inlet valve open as long as channel 242 continues to be exhausted of air. This will continue as long as lever 227 rests upon one of the raised faces of ratchet cam disks 204, 205, 206 or 207.

In the drawings, lever 227 is shown in engagement with ratchet cam disk 206, having six raised faces and six notches, each raised face being separated by a notch, consequently each raised face will cause primary inlet valve 31 to remain open during one-twelfth of a revolution of the cam wheel. This will cause the controlling means of the punch selecting devices to continue in operation and cause holes to be punched in the paper. It will, therefore, be seen that if the player on the piano keys should discontinue pressure upon a key at a wrong time, the maintaining device just described will cause holes to continue to be punched for a certain period of time.

In Fig. 15 is shown four examples, 246, 247, 248 and 249, of paper punched when lever 227 is in engagement with the corresponding ratchet cam disks 204, 205, 206 and 207. If the paper travels in the direction of the arrow, the distance between dotted lines 250 and 251 represents the travel of paper during one measure of time. In example 246, the holes 245 occur at each beat of the measure, and the holes 252 are those recorded by the performer, there being one note recorded on each beat and a note between each beat,—the time being 3/4 time. Hole 253 shows how the note is played on the first beat and how the machine automatically gives it the value of one quarter, and when the performer did not play it the full value. Hole 254 shows how the note is played on the first beat, and how the machine automatically gives it the value of two quarter notes, when the performer did not give it full value. In example 247, the holes 245 occur in accordance with 2/4 time, and the holes 252 represent eighth notes, which are given their proper value by the machine where they have not been played long enough by the performer to give proper value. Hole 253 shows a note given twice the value of note 252. Hole 254 shows a note of three times the value of note 252. In example 248, representing 3/4 time, the holes 252 occur at each beat and are controlled by the maintaining device as to their length, irrespective of the performer having played them a little too short. Hole 253 shows where the performer played the note late and did not, therefore, record it on the beat, but the machine gave it the proper ending. Hole 255 was played late, but was given sufficient time value by the performer to make it cover two beats in the record. In example 249, there are two beats to the measure and the holes 252 represent as before, notes played on the beat but controlled as to their length by the machine. Hole 253 shows a note of twice the value of note 252. Hole 255 shows a note played late by the performer but controlled as to its termination by the maintaining device. In examples 246, 247, 248 and 249, the marginal hole 245 represents the time the metronome beats, thereby guiding the performer to place the records of his playing in line with these holes in the sheet.

To shaft 202 is secured an arm 256, carrying a bevel pinion 257 in mesh with two bevel gear wheels 258 and 259 constituting a differential gearing. Bevel gear wheel 258 is loosely mounted upon shaft 202, and bevel gear wheel 259 is loosely mounted upon another shaft 260, in line with shaft 202. To shaft 260, is secured a worm wheel 261 in mesh with a worm 262, attached to a shaft 263 mounted in arm 256. Secured to shaft 263 is a gear wheel 264 in mesh with a gear wheel 265 on a shaft 266, to which bevel pinion 257 is secured. Shaft 202, arm 256, worm 262 and worm wheel 261 will consequently cause rotation of shaft 260. To shaft 260 is secured a serrated roller 267 mounted in a frame 268, carrying devices used in the operation of the sixth feature of the invention.

Mounted in frame 268 is a swinging frame 269, carrying a rubber roller 270, held against serrated roller 267 by means of a spring 271. The master sheet 272 is passed around and between serrated roller 267 and rubber roller 270, so that revolution of the serrated roller will cause movement of the master sheet in the direction indicated by the arrow. Swinging frame 269 has an arm 273 attached, by which the operator can lift rubber roller 270. A spring actuated support 274, which slips beneath arm 273, holds the rubber roller in the raised position.

The master sheet 272 wound upon a spool 275, placed loosely in a trough 276, is passed between guides 277, 278, over a table 279, and tracker-board 280. Guide 278 is made adjustable with reference to fixed guide 277, by means of thumb nuts 281 and slots 282, formed in the guide, through which the bolts for the thumb nuts pass. The master sheet is held firmly against the tracker-board 280 by means of a weight 283. One edge of weight 283 bears upon the master sheet alongside the row of tracker-ducts 284. The other edge of the weight is held away from the master sheet by means of a bar 285 supporting the weight at 286 from its center. The outer ends of the bar 285 have supports 287 from table 279, the outer ends of the weight having pins 288 loosely fitting corresponding holes formed in bar 285. The outer ends of the weight also have pins 289 fitting vertical guides 290 from table 279. By this construction and a knob 291 on the weight, the weight with the bar 285 can be removed. Tracker-board 280 is made adjustable with reference to the master sheet and guides 277, 278, by means of a screw 292 having a collar 293 mounted in one end of the tracker-board. A frame 294 supporting this end of the tracker-board and adjusting screw 292, is pivoted at 295 to frame 268. The opposite end of the tracker-board is provided with a slot 296 and a cross bar 297, riding beneath guides 298. Riding in slot 296 is a pin 299 formed on one end of a pivoted lever 300, supporting the tracker-board. Lever 300 is pivoted at 301 to a plate 302, attached to frame 268, the lever being clamped to plate 302 by means of a thumb screw 303 and nut 304, engaging plate 302. It will be seen that movement of lever 300 will cause the tracker-board to swing upon pivot 295, and by so doing effect adjustment of the tracker-ducts, with reference to the responsive devices connected thereto, as hereinafter described.

The master sheet, after passing over the tracker-board is passed partly around serrated feed roller 267, between said roller and spring pressed rubber roller 270, partly around the last mentioned roller and then down, as shown in Fig. 11. When the master sheet has passed over the tracker-board and from between the feed rollers 267 and 270, the last end of the master sheet will be connected to spool 275, which will be mounted on bearings 305 and 306 in a manner similar to the placing of music rolls in automatic piano players. Then by means of hand wheel 307, the master sheet will be rewound upon the spool 275.

The tracker-ducts 284 of the tracker-board are connected by rubber tubes 308 to one of the nipples 54, in communication with chamber 57 on one side of diaphragm 30, which actuates primary valve 31, controlling punch selecting devices previously referred to. By making tubes 308 of elastic rubber, the tracker-board is rendered adjustable with reference to the fixed series of nipples 54. In the operation of this feature of the invention, the maintaining device will be disconnected.

One of the tracker-ducts 284 will be traversed by the marginal holes 215 of the master sheet. This duct is connected by a tube 309 to one of the three nipples 54 in communication with the diaphragm 30, controlling primary valve 31, and the punch selecting device, causing the marginal hole 215 to be punched. In this case, tube 214 will be disconnected and the nipple 54 closed by a plug similar to 310. It will be seen that the marginal hole 215 of the master sheet will thus be reproduced in the copy.

Connected to the selecting lever 49, causing marginal holes 215 to be punched, is a rod 311, connected to devices used in the operation of the seventh feature of the invention. Rod 311 is connected to a lever 312 on a pivot pin 313. Also mounted on pivot pin 313 is a lever 314, one end of which has a pendent hook 315, held in engagement with lever 312, by means of a spring 316. The inclined lower end of hook 315 is engaged by a stationary post 317, so that downward movement of lever 312 will cause hook 315 to be released from lever 312, permitting lever 314 to fly back by means of spring 318. One end of lever 314 is provided with a valve 319, which as lever 314 flies back, closes a tube 320 in communication with a chamber 57 on one side of a diaphragm 30. Diaphragm 30 actuates a primary valve 31, controlling a secondary valve 34 in communication with a tube 321, connected to a chamber 322. A secondary valve 323, 324, controls communication of chamber 322 with a tube 325 connected to a power pneumatic 326. Valve 323 is normally held open by air admitted through a tube 327, below a diaphragm 328, which actuates valve 323, 324. When movement of lever 314 causes valve 319 to open, air is admitted through tube 320 to chamber 57 on one side of diaphragm 30, controlling primary and secondary valves in communication with tube 321. This causes air to be exhausted from power pneumatic 326, owing to the normally open valve 323. Movement of the power pneumatic will then take place, which will be of short duration because of the quick release of hook 315 from lever 312.

Power pneumatic 326 is connected by a link 329 to an arm 330 secured to a rock shaft 331. To rock shaft 331 is secured an arm 332, held against a stationary stop 333 by means of a spring 334, attached to arm 330. Arm 332 is provided with a stop 335 which checks the movement of a spring arm 336, rotated by friction against a disk 337, and a spring 338 on shaft 194. As spring arm 336 is carried around by means of shaft 194, its free end strikes an inclined face 339 on stationary stop 333, causing the spring arm to be moved into engagement with stop 335, which checks its further movement. Arm 332 is provided with an upward extension 340, which prevents return movement of spring arm 336, after its passage over inclined face 339. When power pneumatic 326 is actuated, upward extension 340 of arm 332 permits the arm 336 to spring back to its original position. As stop 335 will not then be checking the spring arm, it will be carried around by frictions 337 and 338 on shaft 194. When spring arm 336 is released from arm 332, the spring arm moves back against a number of electric contacts attached to an insulating disk 341, secured to shaft 194. Two contacts 342 on one side of insulating disk 341, are connected to a circular contact plate 343, on the opposite side of the disk. An insulated brush 344, makes contact with plate 343, the brush being electrically connected through an electromagnet 345 to one pole of an electric generator 346. The other pole of generator 346 is connected to an insulated brush 347 adapted to make contact with a circular contact plate 348, attached to one side of insulating disk 341. Contact plate 348 is connected to spring 338, causing friction against spring arm 336.

It will be seen that when spring arm 336 makes contact with one of the contacts 342, an electric circuit will be closed through electromagnet 345 and generator 346. This will energize the electromagnet, causing upward movement of its armature 349. Armature 349 is connected to one end of a pivoted lever 350, the opposite end of the lever being adapted for engagement with a toothed wheel 351, secured to bevel gear wheel 259. This will cause bevel gear wheel 259 to be held stationary. As the arm 256 carrying the bevel pinion 257, will continue to rotate in the direction indicated by the arrow, the bevel gear wheel 259, being held stationary will cause bevel pinion 257, owing to rotation of worm 262 and worm wheel 261, to rotate in a direction to cause an accelerated rotation of shaft 260 and master feed roller 267.

Two contacts 352 are connected to a circular contact plate 353, attached to the periphery of insulating disk 341. An insulated brush 354 makes contact with plate 353, the brush being electrically connected through an electromagnet 355 to electric generator 346. When spring arm 336 makes contact with one of the contacts 352, an electric circuit will be closed through electromagnet 355 and generator 346. This will energize electromagnet 355, causing upward movement of its armature 356. Armature 356 is connected to one end of a pivoted lever 357, the opposite end of the lever being adapted for engagement with a tooth wheel 358, secured to bevel gear wheel 258. Rotation of arm 256 will in this case cause bevel pinion 257 to rotate in a reverse direction, and through the reverse rotation of worm 262 and worm wheel 261, cause a retarded rotation of shaft 260 and master feed roller 267.

Two stops 359 are attached to insulating disk 341, midway between contacts 342 and 352. When spring arm 336 is released from arm 332 and strikes one of the stops 359, it occupies a position in which no accelerating or retarding movement will be imparted to the master feed roller and consequently to the master sheet.

As the shaft 194 carrying the insulating disk 341, is geared to the toothed shaft 76, actuating the punch controlling devices, the normal position of the spring arm when it rests against the neutral stop 359, should be midway in relation to two adjoining teeth of the shaft 76, as shown between the numbers 4 and 5 in Figs. 21 and 22. As the position of spring arm 336 with reference to the insulated contacts and the stops 359 at the time of release, is dependent on the position of the marginal or synchronizing hole 215 of the master sheet, if the travel of the master sheet and the synchronizing holes becomes too slow, so that the time when the punch controlling device in response to the synchronizing hole 215 engages the teeth of the actuating shaft 76 so late as to run the risk of missing it, then spring arm 336 will make contact with accelerating contact 342 and cause the feed roller 267 to advance the master sheet.

If the master sheet runs ahead of the proper speed, so that the punch controlling device in response to the synchronizing hole 215 engages the actuating shaft 76 too soon and runs the risk of catching a tooth of the shaft ahead of the correct one, then spring arm 336 will make contact with retarding contact 352 and cause the feed roller 267 to retard the movement of the master sheet.

To make copies from a master using the synchronizing hole 215, and not reproduce the synchronizing hole in the copy, tube 46 connecting secondary valve 34 to power pneumatic 47, will be disconnected from said power pneumatic and connected to a small power pneumatic 360. This pneumatic is provided with a rod 361 held in its up position by a spring 362. The lower end of rod 361, engages a lever 363, pivoted at 364, and held in its position by a spring 365. Lever 363 is provided with a valve 366, closing an air inlet to tube 320. By this arrangement, valve 366 takes the place of valve 319. Downward movement of rod 361 upon lever 363 causes valve 366 to open momentarily. The lower end of rod 361 slips off from the free end of lever 363, permitting the valve to be closed before return movement of rod 361.

In making copies using commercial perforated music rolls as master sheets, no synchronizing holes are available to keep the holes of the master sheet in step with the punch controlling mechanism. In this case, the holes of the commercial roll are used to actuate the synchronizing mechanism. To accomplish this object, a branch tube 367 is connected to each of a series of tubes 46 communicating with a series of power pneumatics 47. Branch tubes 367 are connected to a series of small power pneumatics, each provided with mechanism which actuates a valve, controlling admission of air to tube 320, in a manner similar to power pneumatic 360.

When spring contact arm 336 has been released, before time has elapsed for it to be carried around to the position to be again engaged by lever 332, power pneumatic 326 should have returned lever 332 to position to engage the spring contact arm, otherwise the spring arm would be again carried around and the accelerating or retarding mechanism would continue its action, thereby causing disarrangement.

In making use of commercial rolls to actuate the synchronizing mechanism, the admission of air to tube 320 by means of valve 319 or valves 366, is liable to occur at short intervals apart, causing power pneumatic 326 to be correspondingly actuated, so that when spring contact arm 336 returns to position to be engaged by arm 332, the arm 332 may not be in position to engage the spring contact arm. To provide for positive return of arm 332 at the proper time by power pneumatic 326, an arm 368 secured to rock shaft 331 is connected by a rod 369 to a lever 370 pivoted at 371. One end of lever 370 is provided with a hook 372, a spring 373 at the opposite end of the lever serving to keep the hook in engagement with an arm 374 mounted on shaft 76. Arm 374 is held in frictional contact with bevel gear wheel 117 by means of a nut 375 upon the screw threaded end 115 of shaft 76. The end of lever 370 opposite the hook 372 is provided with a valve 376, controlling admission of air through tube 327 to a chamber 377, below diaphragm 328, which actuates valves 323, 324. When power pneumatic 326 actuates arm 368, connecting rod 369, and lever 370, hook 372 will release arm 374. While arm 374 is being carried around by shaft 76, power pneumatic 326 releases arm 368 and lever 370, causing valve 376 to shut off air admission through tube 327 to chamber 377. By the action of the bleed hole 378 air will be exhausted from chamber 377, causing exhaust valve 323 to close and air inlet valve 324 to open. The admission of air through tube 325 to power pneumatic 326 results in the return of arm 332 to position to check spring contact arm 336. Then as arm 374 returns to the lever 370, hook arm striking against the lever, causes valve 376 on the opposite end of the lever to be moved away from tube 327, and permit air to enter the tube and cause exhaust valve 323 to open. When the devices responsive to holes in the master cause exhaust of air from tube 321, air will be exhausted from power pneumatic 326, causing its collapse and movement of rock shaft 331, repeating the operations previously described. It will be seen that action of the power pneumatic 326 is prevented while arm 374 on shaft 76 is making one revolution. The valves 366 are liable to be operated so frequently in succession that there may be continuous exhaust in pipe 321. For example, when there is a quick chromatic run, the valves 366 open up one after the other, so as to virtually cause a continuous opening, and this necessitates the use of bleed holes 378, so as to prevent the continuous rotation of the arm 336 during this time; and which would result in a greater acceleration or retard than was necessary, as only one revolution of spring arm 336 on the accelerating or retard contact is sufficient to effect the change of speed.

When making master records of a player on the piano keys, tube 320 is disconnected as at 379, the tube being then closed by a plug 380, thereby rendering valves 319 and 366 inoperative. Another way of rendering valve 319 inoperative is to swing hook 315 clear from engagement with spring 316, and lever 312, as shown in Fig. 14. By this means, the synchronizing mechanism is disconnected.

In Fig. 15ª is shown a master sheet having a series of longitudinal holes 381 along its center, or near the center. The holes indicating by their distance one from another, periods of musical time, and are used for synchronizing purposes by having a toothed wheel 382 engage them, or by having a pneumatic responsive device co-act therewith, kept in step with the perforations. In using the centrally located holes 381, the paper is held more nearly square and the sheet is not weakened by having holes along the edge or edges.

In the operation of the eighth feature of the invention, certain marks are placed upon the master, previous to passing it through the machine, the marks indicating parts of the music which are to be "phrased". When the master, having such marks is passed over the tracker-board, a pointer 383 is moved to the right, if the marks indicate that the music is to be changed from the regular time of the master into faster time, or the pointer 383 will be moved to the left, if slower time is called for by the marks. Pointer 383 is attached to a rod 384 connected at one end to a hand lever 385 pivoted at 386. The other end of rod 384 is connected to one arm of a bell-crank lever 387, pivoted at 388, the other end of the bell-crank being connected by a rod 389 to an arm 390, secured to one end of a shaft 391. To the other end of shaft 391 is secured an arm 392 engaging a groove 393 of a collar 394, sliding on shaft 197, and rotated by said shaft by means of a spline 395 on the shaft fitting a corresponding recess formed in the collar. To collar 394 is secured the friction wheel 198, which is made of rubber, and having a rounded face engaging by friction with the flat side of disk 199. When friction wheel 198 occupies the position shown in Fig. 23, it will be driven by disk 199 at the same speed as the disk. As this is the same speed, and in the same direction as the gear wheel 192, carrying the differential bevel pinions 193, is driven, the shaft 197 will be driven at the same speed as shaft 194. If friction wheel 198 is moved farther to the left, as shown by dotted lines in Fig. 23, it will be moved by disk 199 in the same direction at a faster rate of speed. This will cause bevel gear wheel 196 to move faster than gear wheel 192, thereby causing a faster movement of bevel pinion 193 on one side of gear wheel 192, than the speed of gear wheel 192, in the same direction, and movement of said bevel pinion 193 on the opposite side of gear wheel 192 in a reverse direction, and consequently cause bevel gear wheel 195 in mesh with bevel pinion 193 to be moved by gear wheel 192 at a slower speed than the speed of said gear wheel 192. If friction wheel 198 is moved from the position shown in Fig. 23 to the position shown in Fig. 12, in which the friction wheel stands on a line with the center of disk 199, it will not be moved by the disk. This will cause bevel gear wheel 196 to stand still while the gear wheel 192 continues to rotate. The lack of movement of bevel pinions 193 on one side of gear wheel 192, will cause movement of bevel gear wheel 195 on the opposite side, at a speed twice that of gear wheel 192. If friction wheel 198 is moved farther to the right from the position shown in Fig. 12, it will be moved in a reverse direction, causing bevel gear wheel 196, acting on bevel pinions 193 and bevel gear wheel 195, to further increase the speed of worm shaft 194.

It will be seen that worm shaft 194, can be moved faster or slower than its normal speed, according to whether pointer 383 is moved to the right or to the left of the master sheet. This change in the speed of the worm shaft 194, will cause a corresponding change in the speed at which the master sheet will be moved over the tracker-board, and by so doing cause changes in the spacing of holes in the record. It will be understood that this change in the speed of worm shaft 194 produces the same change in the speed of the master sheets as is caused by the accelerating or retarding magnets 345 and 355, but to a greater degree, consequently while said speed changing magnets may be acting in slight degree, the use of lever 392 can cause changes in the speed also. It will be necessary, however, to restore lever 392 to the position shown in Fig. 23, and thereby cause a speed of shaft 194, which reestablishes the proper relation between the teeth of actuating shaft 76, and the accelerating or retarding contacts 242 and 252, co-acting with the spring arm 386.

Having thus described my invention, I claim:—

1. An apparatus for producing perforated music records, comprising a series of valves operating responsive to the playing of piano keys, pneumatic devices operating responsive to the action of said valves, selecting devices operated by said pneumatic devices, each selecting device having a punch controlling means actuated by a rotating power shaft; a punching mechanism operating responsive to said selecting and punch controlling means, paper feeding means adapted to continuously draw the paper beneath the punches, and means for causing a momentary cessation of the movement of the portion of the paper being punched and simultaneously taking up the slack in the paper.

2. An apparatus for producing perforated music records, comprising a series of punch controlling devices, a series of pneumatic valves adapted to operate said devices, said valves being operated by the piano action in response to the playing of piano keys, the hammer rest of the piano action first causing the valve to open, and the back stop of the wippen then holding the valve open as long as the wippen is held up by pressure on the piano key.

3. In apparatus for producing perforated music records, means for indicating upon the record variations in the manner of playing certain portions thereof, comprising a valve operating responsive to movement of the loud pedal of the piano, pneumatic devices operating responsive to said last mentioned valve, and a pencil actuated by the pneumatic devices, causing a line to be drawn upon the paper during the time the loud pedal is used.

4. In apparatus for producing perforated music records, means for indicating upon the record peculiarities in the manner of playing certain portions thereof, comprising a valve, pneumatic devices operating responsive to said last mentioned valve, and a pencil actuated by the pneumatic devices, causing a line to be drawn upon the paper during the time the manually operated valve remains open, whereby peculiarities of playing, will be recorded on the paper.

5. An apparatus for producing perforated music records, comprising a series of punch controlling devices operating responsive to a series of pneumatic devices, an exhaust chamber in communication with said pneumatic devices, and means for regulating the degree of exhaust in said chamber comprising a pneumatic and a normally closed valve operable thereby under a determinate degree of exhaust.

6. An apparatus for producing perforated music records, comprising a series of punch controlling devices operating responsive to a series of pneumatic devices, an exhaust chamber in communication with said pneumatic devices, and means whereby air may be automatically admitted to said chamber for regulating the degree of exhaust therein comprising a pneumatic connected to said chamber, a spring maintaining said pneumatic normally expanded, and a valve closed when said pneumatic is in expanded condition and controlling the admission of air to said bellows, said valve being opened by the collapsing of said bellows.

7. An apparatus for producing perforated music records, comprising a series of pneumatic devices, a series of punch controlling devices operating responsive thereto, means exhausting air from a chamber in communication with said pneumatic devices, and means for admitting air to said chamber at any degree of exhaust whereby the exhaust in said chamber may be destroyed.

8. An apparatus for producing perforated music records, comprising a series of punches, a series of punch controlling devices co-acting therewith, a rotating toothed shaft for actuating said punch controlling devices, means whereby each punch controlling means can be thrown into or out of engagement with the toothed shaft, and eccentric means for operating said punches.

9. An apparatus for producing perforated music records, comprising a series of punches, a series of punch controlling devices co-acting therewith, a continuously rotated toothed shaft for actuating said punch controlling devices, each punch controlling device comprising a rotary element mounted in a lever, one end of which is pivoted, the other end of the lever being connected to mechanism actuating said lever, whereby the punch controlling device can be thrown into or out of engagement with the toothed shaft.

10. A machine for producing perforated music records, comprising a series of levers pivoted at one end, the other end of the levers being connected to mechanism actuating said levers; an annular cam mounted in each of said levers adapted for engagement with a rotating toothed shaft for actuating said cam, a bell-crank lever pivoted on said first mentioned lever, one arm of the bell-crank engaging the cam, the other arm of the bell-crank being connected to a punch selecting device, the connection being on the line of the pivot of the first mentioned lever.

11. A machine for producing perforated music records, comprising a series of levers, each pivoted at one end, the other end of the levers being connected to mechanism actuating said levers; an annular triple-surfaced cam mounted in each of said levers and adapted for engagement with a rotating shaft for actuating said cam, a bell-crank lever pivoted on said first mentioned lever, one arm of the bell-crank being connected to a punch selecting device, the other arm engaging the center one of the three cam surfaces, the cam surface on one side of the center being adapted for engagement with a stationary stop controlling the up and down movement of the first mentioned lever, the cam surface on the other side of the center being provided with a shoulder which takes against a yielding stop serving to check rotation of the cam.

12. A machine for producing perforated music records, comprising a series of pivoted levers, the levers being connected to mechanism actuating said levers; an annular triple-surfaced cam mounted in each of said levers and adapted for engagement with a rotating shaft for actuating said cam, a bell crank lever pivoted on said first mentioned lever, one arm of the bell-crank being connected to a punch selecting device, the other arm engaging the center one of three cam surfaces, the cam surface on one side of the center being adapted for engagement with a stationary stop limiting the movement of the first mentioned lever in one direction, and the cam surface on the other side of the center being adapted for engagement with a stop limiting the movement of the first mentioned lever in the opposite direction, whereby the cam surface after having started its rotary movement is held in engagement with the shaft during one revolution of the shaft notwithstanding the mechanism actuating said first mentioned lever may have become deënergized a very short interval after it had actuated the lever.

13. A machine for producing perforated music records, comprising a series of pivoted levers, mechanism for actuating said levers, an annular triple-surfaced cam mounted in each of said levers, a rotating shaft for actuating said cams upon the movement of said levers, a bell-crank lever pivoted on said first mentioned lever, a punch selecting device connected to one arm of the bell-crank, one cam surface actuating the other arm of the bell-crank, another cam surface adapted for engagement with a stop limiting the movement of the first mentioned lever, whereby the cam after having traveled a half revolution of the shaft, will be thrown out of engagement with the shaft, owing to the movement of the lever permitted by the cam riding on the stop.

14. A machine for producing perforated music records, comprising a series of pivoted levers, mechanism actuating said levers; an annular triple-surfaced cam mounted in each of said levers, the cam having a tooth which by movement of the lever is thrown into engagement with a toothed rotating shaft actuating said cams, a bell-crank lever pivoted on said first mentioned lever, one arm of the bell-crank being connected to a punch selecting device, the other arm engaging a cam surface for actuating the bell-crank; another cam surface adapted for engagement with a stop limiting the downward movement of the first mentioned lever, whereby the cam after having traveled a half revolution of the shaft, will be thrown out of engagement with the shaft owing to the downward movement of the lever permitted by the cam riding on the stop, said cam tooth engaging the toothed shaft when the first mentioned lever moves upward; a cam surface engaging a stop limiting the upward movement of the lever, whereby the cam after having traveled another half revolution of the shaft, will be thrown out of engagement with the shaft, owing to the upward movement of the lever permitted by the cam riding on the stop.

15. A machine for producing perforated music records, comprising a series of pivoted levers, mechanism actuating said levers; an annular cam mounted in each of said levers, the cam having a yielding tooth, a toothed rotating shaft actuating said cams, through the yielding tooth upon the movement of said levers, a bell-crank lever pivoted on each of said first mentioned levers, one arm of the bell-crank being connected to a punch selecting device, the other arm engaging said cam for actuating the bell-crank, said rotating shaft being provided with a series of two teeth and another series of four teeth; means for shifting the shaft longitudinally, whereby one series of teeth can be thrown out of alinement with the cam tooth and the other series thrown into alinement therewith.

16. A machine for producing perforated music records, comprising a series of pivoted levers, mechanism actuating said levers, an annular cam mounted in each of said levers, the cam having a tooth, a toothed rotating shaft coacting with said tooth to actuate said cams; a bell-crank lever pivoted on each of said first mentioned levers, one arm of the bell-crank engaging said cam for actuating the bell-crank, the other arm being connected to a punch selecting device connected to a punch, the punch being actuated by an eccentric shaft rotated at a speed four times the speed of the first mentioned toothed shaft.

17. In a machine for producing perforated music records, the combination with a series of punches and a rotating eccentric shaft, of a punch selecting device connected to each punch normally restrained from engagement with said shaft, whereby said punch is actuated when the selecting device is permitted to move into engagement with the eccentric shaft.

18. A machine for producing perforated music records, comprising a series of punches actuated by a rotating eccentric shaft, a punch selecting device connected to each punch normally restrained from engagement with said shaft, the selecting device being permitted to move into engagement with the rotating eccentric shaft by means of a spring, and thrown out of engagement by means of a rotating cam.

19. In a machine for producing perforated music records, the combination with a series of punches and a rotating eccentric shaft, of a punch selecting device connected to each punch, for causing said punch to be moved downward when the selecting device is permitted to move into engagement with the eccentric shaft, the punch being provided with an eccentric-strap adapted to embrace the eccentric shaft to cause the upward movement thereof.

20. A machine for producing perforated music records, comprising a series of punches each connected to a carrier, a rotating eccentric shaft engaging the carrier and causing upward movement of the punch, a latch connected to the punch carrier causing downward movement of the punch when the latch is thrown into engagement with the eccentric shaft, the latch being actuated by a finger forming part of a pivoted lever permitting up and down movement of the latch by means of the eccentric shaft.

21. A machine for producing perforated music records, comprising a series of punches, a rotating eccentric shaft actuating said punches, a punch selecting device connected to each punch, the selecting device being thrown into engagement with the rotating eccentric shaft by means of a spring, and thrown out of engagement by means of a cam, a rotating shaft actuating said cam; the shaft which actuates the punch, rotating at a speed four times the speed of the shaft actuating the cam, said cam permitting the punch selecting device to be thrown into engagement with the eccentric shaft when in the upper position of any one of its four revolutions.

22. A machine for producing perforated music records, comprising mechanism imparting an intermittent forward movement to paper being punched, a series of punches co-acting therewith, and a rotating eccentric shaft for actuating said punches, a punch selecting device connected to each punch, the selecting device being permitted to move into engagement with the rotating eccentric shaft by means of a cam, a rotating shaft actuating said cam; the eccentric shaft which actuates the punch, rotating at a speed four times the speed of the shaft actuating the cam, said cam permitting the punch selecting device to be thrown into engagement with the eccentric shaft when in the upper position of any one of its four revolutions, at which time also the paper is given its forward movement.

23. A machine for producing perforated music records, comprising a paper feeding means, a series of punches co-acting therewith, a rotating eccentric shaft for actuating said punches, a punch selecting device connected to each punch, the selecting device being permitted to move into engagement with the rotating eccentric shaft by means of a cam, a rotating shaft actuating said cam; the eccentric shaft which actuates the punch, rotating at a speed four times the speed of the shaft actuating the cam, said cam permitting the punch selecting device to be thrown into engagement with the eccentric shaft when in the back position of one of its four revolutions, whereby one revolution of said cam causes a single round hole to be punched in the paper during four revolutions of the eccentric shaft.

24. A machine for producing perforated music records, comprising a paper feeding means, a series of punches co-acting therewith, a rotating eccentric shaft for actuating said punches, the increment of feed of the paper for each revolution of the eccentric shaft being less than the diameter of the punch, a punch selecting device connected to each punch, the selecting device being thrown into engagement with the rotating eccentric shaft by means of a cam, a rotating shaft for actuating said cam; the eccentric shaft which actuates the punch rotating at a speed four times the speed of the shaft actuating the cam, said cam permitting the punch selecting device to be thrown into engagement with the eccentric shaft when in the back position of one of its four revolutions; means disconnecting said cam from the rotating shaft which actuates it causing the punch selecting device to remain in engagement with the eccentric shaft during its successive revolutions, whereby a hole is punched in the paper for every revolution of the eccentric shaft, causing the holes to run together.

25. A machine for producing perforated music records, comprising mechanism for continuously drawing the paper to be punched beneath the punches, a series of punches co-acting therewith, a rotating eccentric shaft reciprocating said punches, a punch selecting device connected to each punch, means for throwing the punch selecting device into engagement with the eccentric shaft when in the back part of its revolution, means for increasing the speed of that portion of the paper being punched and causing the said portion to stand still during the forward movement of the punch.

26. A machine for producing perforated music records, comprising a continuous paper feeding means, a series of punches co-acting therewith, a rotating eccentric shaft for reciprocating said punches, means for feeding all portions of the paper during the back part of the revolution of said shaft, and means for causing the portion of the paper being punched to be fed at an increased rate just previous to punching and to stand still during the forward part of the revolution of said shaft.

27. A machine for producing perforated music records, comprising a series of punches having up and down movement, a paper feeding means co-acting therewith, consisting of a rotating shaft carrying eccentrics, a roller mounted on said eccentrics over which the paper passes from a horizontal position beneath the punches, and down between feed belts, causing a continuous downward movement of the paper, whereby upward movement of the eccentrically mounted roller by means of its supporting rotating shaft, causes a more rapid movement of the portion of paper beneath the punches.

28. A machine for producing perforated music records, comprising a series of punches having up and down movement, a paper feeding means co-acting therewith, consisting of two rollers mounted on eccentrics attached to rotating shafts, a supply roller from which the paper passes up and over one eccentrically mounted roller from which it is passed horizontally beneath the punches to the other eccentrically mounted roller, feed rollers to which said paper passes causing a continuous downward movement of the paper, whereby upward movement of the first mentioned eccentrically mounted roller by means of its supporting rotating shaft, causes the paper to be drawn from the supply roller, and upward movement of the last mentioned eccentrically mounted roller by means of its supporting rotating shaft, causes a more rapid movement of a portion of the paper than is caused by the feed rollers.

29. A machine for producing perforated music records, comprising a series of punches having up and down movement, a paper feeding means co-acting therewith, consisting of an eccentrically mounted roller over which the paper is passed from a horizontal position beneath the punches, feed rollers between which said paper passes after leaving said roller causing a continuous downward movement of the paper, whereby downward movement of the eccentrically mounted roller causes the horizontal portion of the paper to stand still, and upward movement of said roller causes a more rapid movement of the portion of paper beneath the punches than is caused by the feed rollers.

30. A machine for producing perforated music records, comprising a series of punches having up and down movement, a paper feeding means co-acting therewith, consisting of an eccentrically mounted roller over which the paper is passed from a horizontal position beneath the punches, feed rollers between which said paper passes after leaving said roller causing a continuous downward movement of the paper, whereby downward movement of the eccentrically mounted roller causes the horizontal portion of the paper to stand still during the movement of the punches through the paper, and upward movement of said roller during the up position of the punches causes a more rapid movement of the portion of paper beneath the punches than is caused by the feed rollers.

31. A machine for producing perforated music records, comprising a series of punches, a revolving eccentric shaft for vertically reciprocating said punches, a paper feeding means co-acting therewith, consisting of a roller eccentrically mounted on a shaft rotating at the same speed as the eccentric shaft, feed belts between which said paper passes after leaving said eccentrically mounted roller and to which it moves from a horizontal position beneath the punches causing a continuous downward movement of the paper, whereby downward movement of the eccentrically mounted roller by means of its supporting rotating shaft, causes the horizontal portion of the paper to stand still during the movement of the punches through the paper, and whereby upward movement of said roller during the up position of the punches, causes a more rapid movement of the portion of paper beneath the punches than is caused by the feed belts.

32. A machine for producing perforated music records, comprising a series of punches having up and down movement, a paper feeding means co-acting therewith, comprising two rollers mounted on eccentrics attached to rotating shafts, a number of supply rollers from which the paper passes up and over one eccentrically mounted roller from which it is passed horizontally beneath the punches to the other eccentrically mounted roller, feed belts to which it passes, said feed belts riding over rollers provided with means adjusting the belts to the number of sheets of paper passing between, the rollers being provided with driving means causing the belts to move the paper at a continuous speed; means actuating the shafts carrying the eccentrically mounted rollers, whereby upward movement of the first mentioned eccentrically mounted roller causes paper to be drawn from the supply rollers, and whereby upward movement of the last mentioned eccentrically mounted roller causes a more rapid movement of a portion of the paper than is caused by the feed belts.

33. A machine for producing perforated music records, comprising a paper feeding device, a reciprocating punch co-acting therewith, and means for actuating it, the increment of feed of the paper for each possible reciprocation of the punch being less than its diameter, a punch selecting device connected to said punch, the selecting device being permitted to move into engagement with the mechanism actuating the punch by means of a ratchet cam disk attached to a shaft geared with the shaft actuating the paper feed device, whereby the teeth of the ratchet cam disk cause holes to be punched in the paper at regular distances apart, corresponding to intervals of time during which the paper travels such distances.

34. A machine for producing perforated music records, comprising a paper feeding device, a series of reciprocating punches co-acting therewith, and means for actuating them, the increment of feed of the paper for each possible reciprocation of the punches being less than the diameter of a punch, a punch selecting device connected to each punch, pneumatic devices operating responsive to the playing of piano keys for permitting said selecting device to move into engagement with the mechanism actuating the punch, a metronome device actuated by means of a ratchet cam disk attached to a shaft geared with the shaft actuating the paper feed device, whereby the teeth of the ratchet cam disk cause sounds to be made, separated by intervals of time corresponding to distances traveled by the paper in such time, complemental mechanism by which regular measures of music played on the piano keys are recorded by the holes punched in corresponding lengths of the paper.

35. A machine for producing perforated music records, comprising a paper feeding device, a series of reciprocating punches co-acting therewith, and means for actuating them, the increment of feed of the paper for each possible reciprocation of the punches being less than the diameter of each punch, a punch selecting device connected to each punch, the selecting device being permitted to move into engagement with the mechanism actuating the punch by means of pneumatic devices operating responsive to the playing of piano keys, a maintaining device modifying said pneumatic devices and actuated by means of a ratchet cam disk attached to a shaft geared with the shaft actuating the paper feed device, whereby the punching mechanism thrown into action by the playing of piano keys, will be maintained in action during the intervals of time when the raised faces of the ratchet cam actuate the maintaining device, causing the punch record of notes started by the piano player to be ended by the ratchet cam disk.

36. An apparatus for producing perforated music records, comprising a series of valves operating responsive to the playing of piano keys, primary and secondary pneumatic valves operating responsive to the first mentioned valves, punch selecting devices operating responsive to said valves, a ratchet cam disk actuating a valve, pneumatic devices rendered effective by said disk-actuated valve to exhaust air from a channel having a series of diaphragms, thereby causing said diaphragms to open communication of primary air inlet valves with the chambers in communication with the first mentioned valves, whereby the punch selecting devices are maintained in operation as long as the valve operating responsive to the ratchet cam disk remains open.

37. A machine for producing perforated music records, comprising a paper feeding device, a series of reciprocating punches co-acting therewith, and means for actuating said punches, the increment of feed of the paper for each possible reciprocation of the punches being less than the diameter of each punch, a punch selecting device connected to each punch, the selecting devices being permitted to move into engagement with the mechanism actuating the punches by means of pneumatic devices operating responsive to the playing of piano keys, a maintaining device modifying the control of said pneumatic devices and actuated by means of a ratchet cam disk, one of said punch selecting devices operating responsive to pneumatic devices actuated by a ratchet cam disk; a metronome device actuated by means of a ratchet cam disk, all of said ratchet cam disks being attached to a shaft geared with the shaft actuating the paper feed device, substantially as described.

38. An apparatus for producing perforated music records, operated by a traveling perforated master sheet admitting air to a series of tracker ducts, comprising pneumatic devices operating responsive thereto, punch selecting devices operating responsive to the pneumatic devices, a series of vertically reciprocating punches co-acting therewith, and means for actuating said punches, a paper feeding device co-acting therewith, the punch selecting device being thrown into engagement with the mechanism actuating the punch during the up position of the punch and during the movement of the paper to be punched.

39. An apparatus for producing perforated music records comprising an adjustable tracker-board provided with a series of ducts, pneumatic devices operating responsive thereto, and punch-selecting devices responsive to said pneumatic devices, said tracker-board being provided with means whereby it can be given a longitudinally or a laterally swinging movement with reference to the responsive devices connected thereto.

40. An apparatus for producing perforated music records operated by a traveling perforated master sheet adapted to admit air to a series of tracker ducts, pneumatic devices operating responsive thereto, punch selecting devices operating responsive to the pneumatic devices, a punch controlling means rendered operative by each punch selecting device, a rotating power shaft for actuating said punch-controlling means, the shaft being geared to a shaft actuating a roller for causing continuous travel of the master sheet and being geared to means for increasing the feed of the paper preceding each possible punching operation.

41. An apparatus for producing perforated music records, operated by a traveling perforated master sheet, admitting air to a series of ducts in a tracker-board, comprising pneumatic devices operating responsive thereto, punch selecting devices operating responsive to the pneumatic devices, a weight holding the master sheet against the tracker-ducts, guides which are adjustable to suit the width of the master sheet, means for laterally adjusting the tracker-ducts to register with the holes of the master sheet, and means for adjusting the tracker-ducts with reference to the responsive devices connected thereto.

42. An apparatus for producing perforated music records, operated by a traveling perforated master sheet admitting air to a series of ducts in an adjustable tracker-board and moving in a horizontal plane over said tracker-board, comprising pneumatic devices operating responsive thereto, punch selecting devices operating responsive to the pneumatic devices, a weight holding the master sheet against the tracker-ducts, a revolving corrugated roller bearing upon the upper face of said master sheet and a spring pressed rubber roller superimposed upon said corrugated roller and over which said music sheet passes by which means forward movement is imparted to the master sheet.

43. In an apparatus for producing perforated music records, the combination with a series of ducts, punch selecting devices in communication with said ducts and operating responsive to the travel of a perforated master sheet, of a weight for holding the master sheet against the mouths of the ducts; and feed rollers imparting movement to the master sheet.

44. An apparatus for producing perforated music records, comprising a series of ducts, pneumatic punch selecting devices communicating therewith and operating responsive to the travel of a perforated master sheet, a weight for holding the master sheet against the mouths of the ducts, feed rollers imparting forward movement to the master sheet, and means whereby the last end of the master sheet after passing from between said feed rollers, can be attached to a spool, and the master sheet wound on the spool.

45. An apparatus for producing perforated music records, comprising a series of ducts, punch selecting devices communicating therewith and operating responsive to the travel of a perforated master sheet, a weight for holding the master sheet against the mouths of the ducts, a revolving corrugated roller, a spring pressed rubber roller coacting with said first roller, by which means forward movement is imparted to the master sheet; and means whereby the spring pressed roller can be permanently held out of engagement with the revolving corrugated roller.

46. In an apparatus for producing perforated records, operated by a traveling master sheet having a series of holes longitudinally spaced thereon at equal distances apart, said holes admitting air to a tracker-duct, pneumatic devices operating responsive thereto, a punch selecting device operating responsive to the pneumatic devices, the punch selecting device having a punch controlling means, a rotating shaft actuating said punch controlling means, said shaft being geared to one shaft in gear with a second shaft connected by differential gearing to a third shaft, feed rollers actuated by said third shaft causing travel of the master sheet, two electrically operated devices for affecting said differential gearing thus serving to modify the speed of the master sheet, one of said modifying devices causing a movement of the master sheet faster than its normal speed, the other modifying device causing a slower speed than normal, said modifying devices being electrically connected to insulated contacts on one shaft in gear with another shaft actuating the punch controlling device; the punch selecting device being connected to a device momentarily opening a valve admitting air to pneumatic devices operating responsive thereto, causing a spring arm to be released and make contact with one of said electrically insulated contacts, whereby one of said modifying devices will cause an accelerating or a retarding movement of the master sheet depending on which of said insulated contacts makes contact with said released spring arm.

47. In an apparatus for producing perforated records, operated by a traveling master sheet having a series of holes longitudinally spaced thereon at equal distances apart, said holes admitting air to a tracker-duct, pneumatic devices operating responsive thereto, a punch selecting device operating responsive to the pneumatic devices, a punch controlling device provided with a tooth a rotating shaft having complemental teeth for engagement with said punch controlling device, said shaft being differentially geared to feed rollers causing travel of the master sheet, electrical governing means for said differential gearing comprising a rotatable contact block geared to said toothed shaft, and having three sets of contacts, a spring contact arm rotatable with said block and normally contacting with a member of one set of contacts, means controlled by the punching mechanism for intermittently locking said contact arm in stationary position, said contact arm being determinately positioned with relation to the teeth of said toothed shaft whereby tardy release of said arm by the punching mechanism caused by the slow speed of the master sheet causes said arm to contact with one member of a second set of contacts which operates said electrical governing mechanism to accelerate the movement of the master sheet.

48. In an apparatus for producing perforated records, operated by a traveling master sheet having a series of holes longitudinally spaced thereon at equal distances apart, said holes admitting air to a tracker duct, pneumatic devices operating responsive thereto, a punch selecting device operating responsive to the pneumatic devices, the punch selecting device having a punch controlling device provided with a tooth, a rotating toothed shaft for coöperatively actuating said punch selecting device, said shaft being differentially geared to feed rollers causing travel of the master sheet, an electrically operated device governing said differential gearing, said electrically operated device comprising a contact block geared to said toothed shaft, a contact arm rotatable with said block but normally withheld from the contacts thereon, pneumatic mechanism controlled by the punch selecting device and adapted to release said arm at each operation, said contact block being determinately positioned with relation to the teeth on said toothed shaft, whereby the premature operation of said punch selecting device occasioned by excessive speed of the master sheet causes said arm to close a circuit and operate mechanism to retard the speed of the master sheet.

49. In an apparatus for producing perforated records controlled in its operation by a master sheet, a tracker-board, punch selecting devices, a toothed power shaft coöperating with said devices, feeding means for the master-sheet, differential gearing connecting said feeding means and said power shaft, mechanism for retarding or accelerating the speed transmission of said differential gearing, independent circuits for governing the operation of each of said means, a continually rotatable switch element geared to said power shaft, a spring contact arm frictionally rotatable with said rotary element and adapted to close either circuit, means controlled by one of said punch selecting devices normally maintaining said switch open, said means being adapted upon operation of said punch selecting device to release said spring arm, contacts on said rotary element, one set for each circuit, said contacts being determinately positioned with relation to teeth of said toothed shaft, said spring arm being adapted upon release to close one of said circuits through said contact whereby premature or tardy operation of the punch selecting devices retards or accelerates the feed of the master sheet.

50. An apparatus for producing perforated records, comprising a series of ducts in communication with pneumatic devices operating responsive to the travel of a perforated master sheet, punch selecting devices operating responsive to the pneumatic devices, each punch selecting device having a punch controlling device, a rotating shaft for actuating said punch controlling device, a power pneumatic connected to the pneumatic devices actuating the punch selecting devices and actuating a valve admitting air momentarily to pneumatic devices operating responsive thereto, a stop arm caused by said last named pneumatic devices to release a spring arm, electrically insulated contacts on a revolving shaft in gear with the shaft actuating the punch controlling device and co-operating with said arm, two electrically operated modifying devices connected to said insulated contacts, a differential gearing governed by said modifying devices for connecting the master feed roller shaft with a shaft driven by the shaft carrying the insulated contacts; contact of said spring arm with one insulated contact causing one modifying device to accelerate the movement of the master sheet, and contact of the spring arm with the other insulated contact causing a retarded movement of the master sheet; an arm frictionally rotatable by said rotating shaft, a lever connected to said stop arm and adapted to lock said frictionally rotatable arm and to release said arm upon the operation of the stop arm, a valve connected to said lever for controlling the operating bellows for the stop arm, said valve being opened at the end of the swing of said frictionally rotatable arm and closed during its remaining period of rotation whereby the spring arm is intermittently removed from contact with the insulated contacts on said revoluble shaft for a determinate period.

51. A synchronizing mechanism operated by a traveling master sheet having a series of holes longitudinally spaced thereon at equal distances apart, said holes admitting air to a tracker-duct comprising pneumatic devices operating responsive thereto, the pneumatic devices actuating a valve admitting air momentarily to pneumatic devices operating responsive thereto, a stop arm momentarily actuated by a power pneumatic operated by said devices, a spring arm on a revolving shaft released by the momentary actuation of said stop arm, insulated contacts on a disk attached to said shaft with one of which said released spring arm makes contact, depending on the time of release of the spring arm in response to said holes of the master sheet, two electrically operated modifying devices to which said contacts are connected serving to accelerate or retard the movement of the master sheet, said spring arm being thrown out of engagement with the insulated contacts after one revolution of said shaft, by means of an incline, the spring arm being held out of engagement, and its rotation checked, by means of said stop arm, whereby the speed of the master sheet is controlled by said holes of the master sheet co-acting with the insulated contacts on the revolving shaft.

52. A synchronizing mechanism, operated by a traveling master sheet having a series of holes longitudinally spaced thereon at equal distances apart, said holes admitting air to a tracker-duct, comprising pneumatic devices operating responsive thereto, a power pneumatic operated thereby, a stop arm momentarily actuated by said power pneumatic, a spring arm on a revolving shaft adapted to be released upon said momentary actuation, insulated contacts and neutral stops with one of which said spring arm is adapted to make contact upon release and which are arranged on a disk attached to said shaft, the contact made depending on the time of release of the spring arm in response to said holes of the master sheet, two electrically operated modifying devices to which said contacts are connected; the spring arm being held out of engagement, and its rotation checked by means of said stop arm; whereby the speed of the master may be accelerated or retarded by contact of the spring arm with the insulated contacts, or the speed may remain unchanged if the spring arm engages the neutral stops.

53. An apparatus for producing perforated records, comprising a series of ducts in communication with pneumatic devices operating responsive to the travel of a perforated master sheet, punch selecting devices, pneumatic devices controlling said punch selecting devices, each punch selecting device having a punch controlling devices, a stop arm capable of momentary actu-pneumatic controlled by said pneumatic device, a stop arm capable of momentary actuation by said power pneumatic, a spring arm on a revolving shaft in gear with the shaft actuating the punch controlling device, insulated contacts with which said spring arm is adapted to make contact, depending on the time of release of the spring arm in response to the holes of the master sheet, two electrically operated modifying devices to which said contacts are connected serving to accelerate or retard the movement of the master sheet, an inclined surface-portion for throwing said spring arm out of engagement with said contacts after one revolution of the shaft carrying the spring arm, the spring arm being held out of engagement, and its revolution checked by means of said stop arm; a lever connected to said stop arm an arm on the shaft checked in its revolution by said lever and actuating the punch controlling device, said lever also controlling a valve governing the actuation of said power pneumatic whereby release of the spring arm and said arm on the shaft caused by the momentary actuation of said power pneumatic operates through said lever and pneumatic devices to render said power pneumatic inoperative during the major portion of the revolution of said arm on the shaft.

54. An apparatus for producing perforated records, operated by a traveling master sheet having a series of holes longitudinally spaced thereon at equal distances apart, said holes admitting air to a tracker-duct, comprising pneumatic devices operating responsive thereto, a punch selecting device operating responsive to the pneumatic devices, the punch selecting device having a punch controlling device provided with a tooth, a rotating toothed shaft coacting with said punch controlling device and by which it is actuated, pneumatic devices controlled by said punch-selecting device a power pneumatic, a stop arm, a spring arm normally locked by said stop arm and arranged on a revolving shaft in gear with the shaft actuating the punch controlling device, two sets of insulated contacts, and a set of neutral stops with one of which said spring arm contacts upon release and which are located on a disk attached to the shaft carrying the spring arm, depending on the time of release of the spring arm in response to said holes of the master sheet, two electrically operated modifying devices to which said contacts are connected serving to accelerate or retard the movement of the master sheet, an inclined surface for throwing said spring arm out of engagement with said insulated contacts and neutral stops after one revolution of the shaft carrying the spring arm, the spring arm being held out of engagement, and its revolution checked by means of said stop arm; said insulated contacts and neutral stops, having such relation to the teeth of the shaft actuating the punch controlling device, and the holes of the master sheet, that the premature, tardy or normal engagement of the tooth of the punch controlling device with the teeth of its actuating shaft controlled by the punch selecting device in response to the holes of the master sheet will cause the release of said spring arm at a moment to effect its engagement with a contact of either set or with one of said neutral stops to cause retardation, acceleration, or maintenance of the feed of the master sheet.

55. An apparatus for producing perforated records, comprising a series of ducts in communication with pneumatic devices operating responsive to the travel of an irregular perforated master sheet, punch selecting devices operating responsive to the pneumatic devices, a punch controlling device connected to each punch-selecting device and provided with a tooth, a revolving toothed shaft actuating said punch-controlling device, mechanism operated by said pneumatic devices for admitting air momentarily to pneumatic devices operating responsive thereto, a power pneumatic operated thereby a stop arm adapted to be momentarily actuated by said power pneumatic a spring arm locked in inoperative position by said stop arm and located on a revolving shaft in gear with the toothed shaft actuating the punch controlling device, said spring arm upon its release making contact with one of several insulated contacts, depending on the time of release of the spring arm in response to the holes of the master sheet, two electrically operated modifying devices connected to said insulated contacts and serving to accelerate or retard the movement of the master sheet, an inclined surface portion for throwing said spring arm out of engagement with said insulated contacts, after one revolution of the shaft carrying the spring arm, the spring arm being held out of engagement, and its revolution checked by means of said stop arm; a lever connected to said stop arm an arm on the toothed shaft checked in its revolution by said lever, a valve connected to said lever for controlling communication of said power pneumatic with the pneumatic devices actuating it; so that, after said momentarily actuated power pneumatic has caused the release of the spring arm and release of the arm on the toothed shaft, said lever renders said pneumatic inoperative until the actuation of the valve by the arm on the toothed shaft after it has made one revolution; said insulated contacts and neutral stops, having a determinate position with relation to the teeth of the shaft and the rotatable arm on the shaft that any relative error of operation between the master feeding rolls and the punch controlling mechanism coacting with the toothed shaft will be automatically rectified by the spring arm coacting with one of said insulated contacts or the correct relative operation of said master feeding rolls and said punch controlling mechanism will be maintained by said spring arm engaging the neutral stops.

56. A synchronizing mechanism, comprising a series of ducts, pneumatic devices operating responsive to the travel of an irregularly perforated master sheet over the mouths of said ducts, said pneumatic devices actuating valves admitting air momentarily to pneumatic devices operating responsive thereto, a power pneumatic operated thereby, a stop arm momentarily actuated by said power pneumatic, a spring arm on a revolving shaft locked by said stop arm and adapted to be released upon the operation of the same, several sets of insulated contacts and one set of neutral stops with any set of which said released spring arm is adapted to contact upon release, depending on the time of release of the spring arm in response to the holes of the master sheet, two electrically operated modifying devices connected to said insulated contacts, an inclined surface for throwing said released spring arm out of engagement with said insulated contacts and neutral stops, after one revolution of said shaft, the spring arm being held out of engagement, and its revolution checked, by means of said stop arm; a lever connected to said stop arm, an arm on a shaft in gear with the first mentioned shaft and adapted to be checked in its revolution by said lever, a valve controlled by said lever for regulating action of said power pneumatic with the pneumatic devices actuating it; so that, after said momentarily actuated power pneumatic has caused the release of the spring arm, and the arm released by the lever, said lever causes the valve to close and render said power pneumatic inoperative until said lever is actuated by its coacting arm; said insulated contacts and neutral stops having such relation to the power pneumatic operative only at the end of successive revolutions of the last mentioned arm, that the premature, tardy or normal engagement of the tooth of the punch controlling device with the teeth of its actuating shaft controlled by the power pneumatic in response to the irregularly spaced holes of the master sheet will cause the release of said spring arm at a moment to effect its engagement with a contact of either set or with one of said neutral stops to cause retardation, acceleration, or maintenance of the feed of the master sheet.

57. An apparatus for producing perforated music records, operated by a traveling perforated master sheet admitting air to a series of tracker ducts, comprising pneumatic punch selecting devices operating responsive thereto, a rotating shaft actuating feed rollers causing travel of the master sheet, said shaft being connected by differential gearing to a second shaft driven by friction gear with a rotating disk, which is in gear with a third shaft causing the differential gearing to rotate at the same speed as the second shaft, whereby the first mentioned shaft is driven at the same speed as the last mentioned shaft, said friction gear with the disk being manually adjustable, so that the speed of the last mentioned shaft can be changed, causing a change in the speed of the first mentioned shaft actuating the feed rollers of the master sheet.

58. An apparatus for producing perforated music records, operated by a traveling perforated master sheet admitting air to a series of tracker-ducts, comprising pneumatic punch selecting devices operating responsive thereto, a rotating shaft, feed rollers actuated by said rotating shaft for causing travel of the master sheet, said shaft being connected by differential gearing to a second shaft, a third shaft, frictional gearing with a rotating disk gear between said second and third shaft causing the differential gearing to rotate at the same speed as the shaft driven by the disk, whereby the first mentioned shaft is driven at the same speed as the last mentioned shaft, said friction gear with the disk being manually adjustable, so that the last mentioned shaft can be rotated at a faster speed, causing said differential gearing to retard the rotation of the first mentioned shaft actuating the feed rollers of the master sheet.

59. An apparatus for producing perforated music records, operated by a traveling perforated master sheet admitting air to a series of tracker-ducts, comprising pneumatic punch selecting devices operating responsive thereto, a rotating shaft, feed rollers causing travel of the master sheet, said first shaft being connected by differential gearing to a shaft driven by friction gear with a rotating disk which is in gear with a second shaft causing the differential gearing to rotate at the same speed as the first shaft, whereby the first mentioned shaft is driven at the same speed as the second shaft, said friction gear with the disk being manually adjustable, so that rotation of the last mentioned shaft can be stopped, causing said differential gearing to accelerate the rotation of the first mentioned shaft actuating the feed rollers of the master sheet.

60. An apparatus for producing perforated music records, operated by a traveling perforated master sheet admitting air to a series of tracker-ducts, comprising pneumatic punch selecting devices operating responsive thereto, a rotating shaft, feed rollers actuated by said shaft for causing travel of the master sheet, said shaft being connected by differential gearing to a second shaft driven by speed gearing with a rotating disk which is in gear with a third shaft causing the differential gearing to rotate at the same speed, as the shaft driven by the disk, whereby, the first mentioned shaft is driven at the same speed as the last mentioned shaft, said speed gearing with the disk being manually adjustable, so that the direction of rotation of the last mentioned shaft can be reversed, causing said differential gearing to greatly accelerate the rotation of the first mentioned shaft actuating the feed rollers of the master sheet.

61. An apparatus for producing perforated music records, operated by a traveling perforated master sheet admitting air to a series of tracker-ducts, comprising pneumatic punch selecting devices operating responsive thereto, a rotating shaft, feed rollers actuated thereby for causing travel of the master sheet, said shaft being connected by differential gearing to a second shaft driven by speed gearing with a rotating disk which is in gear with a third shaft causing the differential gearing to rotate at the same speed as the shaft driven by the disk, whereby the first mentioned shaft is driven at the same speed as the last mentioned shaft, said speed gearing with the disk being manually adjustable, a hand lever and a pointer co-acting therewith and with the master sheet, whereby movement of said pointer toward one margin or the other of the master sheet will cause a change in the speed of the first mentioned shaft actuating the feed rollers of the master sheet.

62. An apparatus for producing perforated music records, operated by a traveling master sheet having a series of holes longitudinally spaced thereon at equal distances apart, and also irregularly spaced holes, said holes admitting air to tracker-ducts, comprising pneumatic devices operating responsive thereto, punch selecting devices operating responsive to the pneumatic devices, the punch selecting device operating responsive to said regularly spaced holes, being connected to a device momentarily opening a valve admitting air to pneumatic devices operating responsive thereto, a power pneumatic operated thereby, a stop arm adapted to be momentarily actuated by said power pneumatic, a spring arm on a revolving shaft, feed rollers differentially geared to said revolving shaft for causing travel of the master sheet, insulated contacts, and neutral stops, with one of which said spring arm is adapted to make contact upon release depending on the time of release of the spring arm, two electrically operated modifying devices connected to said contacts and co-acting with said differential gearing, and causing said differential gearing to accelerate or retard the movement of the shaft actuating the master feed rollers, an inclined surface element for throwing said released spring arm out of engagement with said insulated contacts and neutral stops, after one revolution of its actuating shaft, said spring arm being held out of engagement and its revolution checked by means of said stop arm.

63. An apparatus for producing perforated records, operated by a traveling master sheet having a series of holes longitudinally spaced thereon at equal distances apart, and also irregularly spaced holes, said holes admitting air to tracker-ducts, comprising pneumatic devices operating responsive thereto, punch selecting devices operating responsive to the pneumatic devices, the punch selecting device operating responsive to said regularly spaced holes, being connected to a device momentarily opening a valve admitting air to pneumatic devices operating responsive thereto, a power pneumatic operated thereby, a stop arm, a spring arm adapted to be locked by said stop arm and mounted on a revolving shaft which is differentially geared to a second shaft, feed rollers actuated by said second shaft for causing travel of the master sheet, insulated contacts and neutral stops, with one of which said spring arm is adapted to make contact upon release depending on the time of release of the spring arm, two electrically operated modifying devices connected to said contacts and co-acting with said differential gearing to accelerate or retard the movement of the shaft actuating the master feed rollers, an inclined surface element for throwing said released spring arm out of engagement with said insulated contacts and neutral stops after one revolution of its actuating shaft, said spring arm being held out of engagement and its revolution checked by means of said stop arm, a third shaft connected to power and differentially geared to said first shaft, and manually controllable speed gearing coöperating with said third shaft and said differential gearing to vary the speed of the first shaft with relation to the power and thereby vary the speed of the feed rollers of the master sheet.

64. An apparatus for producing perforated music records, comprising a paper feeding device, a series of reciprocating punches co-acting therewith, and means for actuating them, a punch selecting device connected to each punch, the selecting devices being thrown into engagement with the mechanism actuating the punch by means of pneumatic devices operating responsive to the playing of piano keys, and also responsive to the travel of a perforated master sheet over a tracker-board, one of said punch selecting devices operating responsive to a ratchet cam disk attached to a shaft geared with the shaft actuating the paper feed device, causing holes to be punched in the paper at regular distances apart, said last mentioned punch selecting device being adjustable, so as to operate responsive to the travel of said regularly spaced holes over said tracker-board.

65. An apparatus for producing perforated music records comprising a paper feeding device, a series of reciprocating punches coacting therewith, a punch selecting device connected to each punch, pneumatic means, keyboard and tracker-board controlled, for rendering said punches operative, means for operating said punches, means operated by the paper feeding device for operating one of said punches at determinate intervals, and means for rendering said punch operable by a tracker duct, whereby the resultant perforations may be reproduced in a copy.

66. An apparatus for producing perforated music records comprising a paper feeding device, a series of reciprocating punches coacting therewith, a punch selecting device connected to each punch, keyboard and tracker-board controlled means for permitting said punches to move into operative position, means for operating said punches, and means coacting with the paper feeding means for operating one of said punches at determinate intervals, said means being capable of producing differently spaced sets of perforations, the units of which are relatively invariable.

67. An apparatus for producing perforated music records comprising a paper feeding device, a series of reciprocating punches coacting therewith, a punch selecting device connected to each punch, keyboard and tracker-board controlled means for permitting said punches to move into operative position, means for operating said punches, a revoluble disk controlled by said paper feeding device, a plurality of sets of notches on said disk, means governed by either of said sets of notches for moving one of the punches into operative position momentarily whereby the punch is operated at determinate intervals.

68. An apparatus for producing perforated records operated by a traveling master sheet having a plurality of regularly spaced holes and a plurality of irregularly spaced holes coacting with a tracker-board, pneumatic devices controlled by said master sheet through said tracker-board, punch selecting devices controlled by said pneumatic devices, a main rotating shaft for operating said punch selecting devices, means for feeding said master sheet, a differential gearing comprised in said last named means, means coacting with said rotating shaft and rendered operative by said regularly spaced holes in the master sheet for acting upon said differential gearing to maintain constant feed of the master sheet, and means for changing the speed of the master sheet.

69. An apparatus for producing perforated records operated by a traveling master sheet having a plurality of regularly spaced holes and a plurality of irregularly spaced holes co-acting with a tracker-board, pneumatic devices controlled by said master sheet through said tracker-board, punch selecting devices controlled by said pneumatic devices, a main rotating shaft for operating said punch selecting devices, means for feeding said master sheet, a differential gearing comprised in said last named means, electrically operated regulating means coacting with said main shaft and controlled by one of the punch selecting devices through the medium of said regularly spaced holes in the master sheet whereby said differential gearing is governed to maintain a practically constant speed of the master sheet, and means for altering the speed of the master sheet.

70. In an apparatus for producing perforated records, means operated by a traveling master sheet for reproducing perforations in sheets of paper, means for feeding the master sheet, means coacting with the former means for maintaining constant the action of the latter means, and means for changing the speed of the feeding means.

71. In an apparatus for producing perforated records controlled in its operation by a master sheet having a series of auxiliary perforations regularly spaced, a tracker-board, pneumatics for operating a punch responding to said perforations during the passage of the master sheet over the tracker-board, feeding means for the master sheet, differential gearing between said feeding means and a source of power, rotatable electric means coacting with the source of power, an automatic switch for said electrical means, a plurality of contacts on said rotatable electric means, means operable by said pneumatics normally holding said switch open, said means adapted to intermittently permit said switch to strike a neutral point or close one of a plurality of circuits through one of said contacts, a locking device in each of said circuits coacting with said differential gearing, one serving to retard and the other to accelerate the transmitted rotation according to the relative speed of the source of power and the traveling master sheet.

72. An apparatus for producing perforated music records comprising pneumatically governed punches, a rotary power shaft, feed rollers for a master sheet, and differential gearing between said power shaft and feed rollers whereby varying speeds of the feed rollers may be attained.

73. An apparatus for producing perforated music records comprising pneumatically governed punches, a rotary power shaft, feed rollers for a master sheet, and manually controllable differential gearing between said power shaft and said feed rollers whereby varying speeds of said feed roller may be attained.

74. An apparatus for producing perforated music records comprising pneumatically governed punches, means for causing said punches to produce overlapping perforations, a metronome device for indicating required duration of a note, and automatic means coacting with said metronome for controlling the duration of any punching operation.

75. An apparatus for producing perforated music records comprising pneumatically governed punches, means for causing said punches to produce overlapping perforations in a sheet, a metronome device for indicating required duration of a note, and automatic means coacting with said metronome for maintaining any punching operation irrespective of inaccuracies of fingering.

76. An apparatus for producing perforated music records comprising pneumatically governed punches, means for causing said punches to produce overlapping perforations in a sheet, a metronome device for setting a time limit for each note, and means operated by said metronome device for causing each perforation to conform to said time limit.

77. In apparatus for producing perforated music records, means for indicating upon the record variations in the manner of playing certain portions thereof.

78. An apparatus for producing perforated music records, comprising selectively operated reciprocatory punching mechanism, continuous paper feeding means, mechanism for momentarily interrupting the feed of a portion of said paper, said mechanism constructed to take up the slack in the paper caused by said interruption previous to each possible punching operation.

79. An apparatus for producing perforated music records, comprising a series of pneumatic valves, a series of punch-controlling devices operating responsive to said valves, said valves being operated by the piano action in response to the playing of piano keys, means whereby the punch-controlling devices responsive to the keys of one octave are continually responsive to the keys of another.

80. A machine for producing perforated music records comprising a series of punches, a revolving eccentric shaft for vertically reciprocating said punches, a main paper-feeding mechanism for drawing the paper downwardly at a uniform rate of speed from beneath the punches, supplemental mechanism for guiding the paper in a horizontal plane beneath the punches, said mechanism being constructed to increase the feed of that portion of the paper beneath the punches just previous to each possible punching operation and to permit the taking up of the excess caused thereby during each possible punching operation and during which taking-up the portion directly subject to the punches is longitudinally immovable.

81. An apparatus for producing perforated music records comprising a paper feeding device, pneumatic devices controlled by the playing of piano keys, punches, punch selecting devices operating responsive to the pneumatic devices, a metronome device controlled as to rate of speed by the paper feeding device, whereby sounds are made at determinate intervals, and complemental mechanism for terminating each note at a definite period of time determined by the stroke of the metronome.

82. An apparatus for producing perforated music records comprising pneumatic punch-selecting devices operating responsive to a traveling perforated master sheet, a rotating power shaft, punch controlling devices governed thereby, mechanism for feeding a master sheet, differential gearing for connecting said mechanism to said power shaft, electrical means for retarding transmission by said differential gearing, electrical means for accelerating transmission by said differential gearing, a compound rotatable switch element capable of governing each of said electrical means and determinately positioned with relation to said power shaft, pneumatic means governed by the punch selecting devices for normally maintaining said switch in inoperative position, said pneumatic means being adapted to be intermittently operated to render said switch operative whereby either of said electrical means may be made effective to insure a relatively constant feed of the master sheet or whereby a neutral point may be struck.

83. In apparatus for producing perforated music records comprising pneumatic punch-selecting devices operating responsive to a traveling perforated master sheet, a rotating power shaft, punch controlling devices governed thereby, mechanism for feeding a master sheet, differential gearing for connecting said mechanism to said power shaft, electrical means for retarding transmission by said differential gearing, electrical means for accelerating transmission by said differential gearing, a compound rotatable switch element capable of governing each of said electrical means and determinately positioned with relation to said power shaft, pneumatic means governed by the power shaft for normally maintaining said switch in inoperative position, means connected to the punch-selecting devices for intermittently releasing and permitting said switch to operate, whereby either of said electrical means may be operated or neutral points struck, thus insuring synchronism of operation between the traveling master sheet and the reproducing mechanism.

84. An apparatus for producing perforated music records, comprising pneumatic punch-selecting devices, a power shaft coacting with said punch-selecting devices, feed rollers for causing travel of a master sheet, differential gearing connecting said power shaft and feed rollers and a speed gearing whereby the degree of transmitted speed may be varied.

85. An apparatus for producing perforated music records comprising pneumatic punch-selecting devices, a power shaft coacting with said punch-selecting devices, feed rollers for causing travel of a master sheet, differential gearing connecting said power shaft and feed roller, a frictional speed gearing governing one of the elements of said differential gearing, normally controlled means comprising an indicator coacting with the master sheet for regulating said frictional gearing whereby the degree of transmitted speed may be varied.

86. An apparatus for producing perforated music records, comprising a series of valves operating in response to the playing of piano keys, pneumatic devices operating responsive to the action of said valves, selecting devices operated by said pneumatic devices, each selecting device having a punch controlling means actuated by a rotating power shaft, a punching mechanism operating in response to said selecting and controlling means, paper feeding means adapted to continuously draw the paper beneath the punches, means for causing an increased speed of a portion of the paper before reaching the paper feeding means, thereby obtaining a slack, said means being constructed to maintain the paper longitudinally immovable for a determinate period of time.

87. An apparatus for producing perforated music records comprising a series of valves operating in response to the playing of piano keys, pneumatic devices operating responsive to the action of said valves, selecting devices operated by said pneumatic devices, each selecting device having a punch controlling means actuated by a rotating power shaft, a punching mechanism operating in response to said selecting and controlling means, means adapted to continuously draw the paper beneath the punches, means for intermittently increasing the feed of the portion of the paper being punched, and for preventing slack said means being adapted to maintain the said portion in a longitudinally immovable position during the take-up of the excess material produced by the increased speed.

88. An apparatus for producing perforated music records comprising a series of valves operating in response to the playing of piano keys, pneumatic devices operating responsive to the action of said valves, selecting devices operated by said pneumatic devices, each selecting device having a punch controlling means actuated by a rotating power shaft, a punching mechanism operating in response to said selecting and controlling means, paper-feeding means for drawing the paper beneath the punches, supplemental means for intermittently increasing the feed of that portion of the paper being punched, and simultaneously maintaining said portion taut, said means being constructed to maintain said portion longitudinally immovable during the take-up of the excess material produced by said increased feed and during the punching operation.

89. An apparatus for producing perforated music records, comprising a series of valves operating in response to the playing of piano keys, pneumatic devices operating responsive to the action of said valves, selecting devices operated by said pneumatic devices, each selecting device having a punch controlling means actuated by a rotating power-shaft, a punching mechanism operating in response to said selecting and controlling means, paper feeding means for drawing the paper beneath the punches, supplemental means for intermittently increasing the feed of that portion of the paper being punched and simultaneously maintaining said portion taut and longitudinally immovable, said supplemental means being constructed to release said tautened portion after each punching operation.

90. An apparatus for producing perforated music records comprising pneumatic punch-selecting devices, a power shaft coacting with said punch-selecting devices, differential gearing connecting said power pneumatic and feed rollers, speed gearing controlling said differential gearing for varying the degree of speed transmitted, said speed gearing comprising a stationary rotatable disk and normally adjustable coacting roller.

In testimony whereof, I affix my signature, in the presence of two witnesses.

HENRY PRICE BALL.

Witnesses:
   FREDERICK A. BLOUNT,
   PAUL H. MARROW.